United States Patent [19]

Hähnke et al.

[11] Patent Number: 4,772,292
[45] Date of Patent: Sep. 20, 1988

[54] MIXTURE OF YELLOW DISPERSE DYESTUFFS CONTAINING PYRIDONE DISAZO DYE

[75] Inventors: Manfred Hähnke, Kelkheim; Ulrich Bühler, Alzenau; Albert Bode, Schwalbach, all of Fed. Rep. of Germany

[73] Assignee: Cassella Aktiengesellschaft, Frankfurt am Main, Fed. Rep. of Germany

[21] Appl. No.: 126,860

[22] Filed: Nov. 30, 1987

Related U.S. Application Data

[63] Continuation of Ser. No. 946,374, Dec. 24, 1986, abandoned, which is a continuation of Ser. No. 826,895, Feb. 6, 1986, abandoned.

[30] Foreign Application Priority Data

Feb. 21, 1985 [DE] Fed. Rep. of Germany ....... 3505899

[51] Int. Cl.⁴ .................... C09B 31/15; C09B 67/22; D06P 1/16; D06P 3/54
[52] U.S. Cl. ............................. 8/639; 8/638; 8/662; 8/687; 8/921; 8/922; 534/756; 534/772
[58] Field of Search ............................. 8/639

[56] References Cited

U.S. PATENT DOCUMENTS

| | | | |
|---|---|---|---|
| 3,817,975 | 6/1974 | Berrie et al. | 534/756 |
| 3,923,776 | 12/1975 | Gnad | 534/772 |
| 3,932,122 | 1/1976 | Ramanathan | 534/756 |
| 4,133,806 | 1/1979 | Gnad | 534/772 |
| 4,224,220 | 9/1980 | Lamm | 534/756 |

FOREIGN PATENT DOCUMENTS

1295893 11/1972 United Kingdom .
1588372 4/1981 United Kingdom .
2174406 11/1986 United Kingdom .

*Primary Examiner*—A. Lionel Clingman
*Attorney, Agent, or Firm*—Connolly and Hutz

[57] ABSTRACT

A dyestuff mixture for coloring synthetic fibers a yellow color contains as component A a dyestuff of the formula

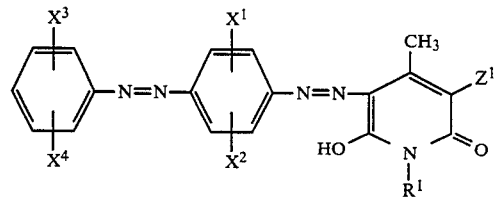

and as component B a different yellow disperse dyestuff species.

20 Claims, No Drawings

MIXTURE OF YELLOW DISPERSE DYESTUFFS CONTAINING PYRIDONE DISAZO DYE

This is a continuation of application Ser. No. 946,374 filed Dec. 14, 1986, abandoned, which in turn is a continuation of application Ser. No. 826,895 filed Feb. 6, 1986, abandoned.

As is known, polyester (PES) fibres can be dyed with disperse dyestuffs by the exhaustion process using the high temperature method (preferably at 130° C.) or the boiling point method (at 95°–100° C.), as well as using the thermosol method (preferably at 210° C.).

Dyestuffs which have or produce a high level of fastness to heat-setting (fastness to dry heat-setting) are preferably suitable for the high temperature method and for the thermosol method.

In practice, selected dyestuffs in the yellow range (yellow, yellow-brown or golden yellow) from the series of monoazo-hydroxy-pyridone dyestuffs or methine dyestuffs are used for this. Dyestuffs of these series lead to greenish-tinged yellow dyeings on PES. Because their extinction and reflectance maxima are close to the near UV range, they have a limited tinctorial strength.

There are possibilities for entering the reddish-tinged yellow range or golden yellow range with the hydropyridone dyestuffs by transfer from the monoazo to the disazo type, and in particular usually with a clear increase in tinctorial strength. However, these dyestuffs do not have an adequate affinity in PES dyeing by the HT method or by the thermosol method, that is to say at the dyeing temperatures of 130° or 210° C., which are customary in practice, only low to medium depths of colour are obtained.

On the other hand, dyeings on PES with disazo-hydroxypyridone dyestuffs exhibit an exceptionally high fastness to dry heat-setting and pleating and exceptionally low (that is to say advantageous) thermomigration. Thermomigration here is to be understood as meaning the deterioration of the wet-fastness properties of dyeings during after-treatment with permanent finishing agents, softeners, spooling oils, antistatics and the like over a short time within the second or minute range at elevated temperature or over a long time within the month or year range at room temperature.

It has not been found, surprisingly, that very good affinity properties are obtained in the HT and thermosol dyeing method on PES, whilst retaining the outstanding fastness to dry heat-setting and thermomigration properties, if a dyestuff mixture according to the invention is used. A dyestuff mixture, according to the invention, of yellow disperse dyestuffs consists of the dyestuff components A and B or contains these dyestuff components, dyestuff component A consisting of a dyestuff of the formula I

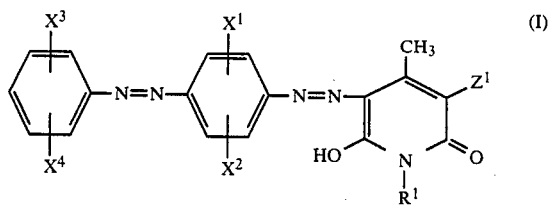 (I)

and dyestuff component B consisting of one or more other dyestuffs of the formula I and/or one or more other yellow, golden yellow or yellow-brown disperse dyestuffs from the series comprising monoazo, disazo and methine dyestuffs, and $R^1$ denotes —H; alkyl with 1 to 8C atoms, which can be substituted by —Cl, —Br, —CN, phenyl, ($C_1$–$C_4$)alkyl-substituted phenyl or alkoxycarbonyl which has 1 to 4C atoms in the alkoxy group and is optionally substituted by —Cl, —Br, phenyl, —CN, ($C_1$–$C_4$)alkoxy, ($C_1$–$C_4$)-alkoxy-($C_2$–$C_4$)alkoxy, phenoxy, ($C_3$–$C_5$)alkenyloxy, cyclopentyloxy or cyclohexyloxy; alkyl with 2 to 4C atoms, which can be substituted by hydroxyl, alkoxy with 1 to 4C atoms, alkoxyalkoxy with a total of 2 to 8C atoms, phenoxy which is optionally substituted by ($C_1$–$C_6$)alkyl, cyclopentyl or cyclohexyl, alkenyloxy with 3 to 5C atoms, cyclopentyloxy, cyclohexyloxy, furfuryloxy, tetrahydrofurfuryloxy, alkylcarbonyloxy which has 1 to 4C atoms in the alkyl group and is optionally substituted by —Cl, —Br, —CN, phenyl, phenoxy in ($C_1$–$C_4$)alkoxy, phenylcarbonyloxy which is optionally monosubstituted or polysubstituted by independent substituents from the group comprising —Cl, —Br and methyl, alkoxycarbonyloxy which is optionally substituted by —Cl, Br, —CN, phenyl, phenoxy or ($C_1$–$C_4$)alkoxy, phenoxycarbonyloxy which is optionally monosubstituted or polysubstituted by independent substituents from the group comprising —Cl, —Br and methyl, phenylaminocarbonyloxy which is optionally monosubstituted or polysubstituted by independent substituents from the group comprising —Cl, —Br and methyl, or mono- or dialkyl-substituted aminocarbonyloxy which has 1 to 4C atoms in the alkyl radicals and is optionally substituted by —OH, ($C_1$–$C_4$)alkoxy or phenoxy in the alkyl radicals; alkenyl with 3 to 5C atoms; cyclopentyl; cyclohexyl; optionally substituted phenyl; phenylamino; benzyl; furfuryl; tetrahydrofurfuryl or 1,1-dioxotetrahydrothien-3-yl; $Z^1$ denotes —CN or —CONR$^2$R$^3$; $X^1$ denotes —H; alkyl with 1 to 4C atoms, which can be substituted by hydroxyl or alkoxy with 1 to 4C atoms; alkoxy with 1 to 4C atoms; alkoxy with 2 to 4C atoms, which is substituted by hydroxyl or alkoxy with 1 to 4C atoms; —F; —Cl; —Br; $X^2$ denotes —H; alkyl with 1 to 4C atoms; alkoxy with 1 to 4C atoms; alkoxy with 2 to 4C atoms, which is substituted by hydroxyl or alkoxy with 1 to 4C atoms; —F; —Cl; —Br or alkylcarbonylamino with 1 to 4C atoms in the alkyl radical; —OH; or —NO$_2$; or $X^1$ and $X^2$ together denote

$X^3$ denotes one of the meanings of $X^1$; $X^4$ denotes —H; alkyl with 1 to 4C atoms, which can be substituted by hydroxyl or alkoxy with 1 to 4C atoms; alkoxy with 1 to 4C atoms; alkoxy with 2 to 4C atoms, which is substituted by hydroxyl or alkoxy with 1 to 4C atoms; —F, —Cl; —Br; —NO$_2$; —CF$_3$; —CN; —CONR$^2$R$^3$; —COOR$^3$; —COR$^3$; —SO$_2$—NR$^2$R$^3$; —SO$_2$—OR$^3$; —SO$_2$—R$^3$; —SO$_2$—R$^3$; —SO$_2$NH$_2$; or 5-R$^3$-substituted-1,2,4-oxadiazol-3-yl; $R^2$ denotes —H; alkyl with 1 to 8C atoms; alkyl with 2 to 4C atoms, which is substituted by hydroxyl or alkoxy with 1 to 4C atoms or alkoxyalkoxy with a total of 2 to 8C atoms or allyloxy; optionally substituted alkenyl with 3 to 5C atoms; or optionally substituted phenyl or benzyl; and $R^3$ denotes one of the meanings of $R^2$, with the exception of hydrogen, and moreover furfuryl or tetrahydrofurfuryl, the weight ratio of components A:B being (10 to 90):(90 to 10).

The weight ratio of dyestuff components A:B is preferably (20 to 70):(80 to 30).

Dyestuff component B preferably contains or consists of a dyestuff of the formula II

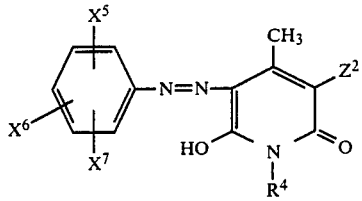 (II)

wherein the substituents have the following meanings: $R^4$: one of the meanings of $R^1$; $Z^2$: one of the meanings of $Z^1$; $X^5$: one of the meanings of $X^1$; $X^6$: one of the meanings of $X^4$, and moreover also —O—SO$_2$—NR$^2$R$^3$; —OSO$_2$R$^3$; —O—CO—R$^3$; or —O—COOR$^3$, and $X^7$: one of the meaning of $X^1$, and moreover optionally substituted phenoxy.

Dyestuff component B can, however, preferably also consist of another dyestuff or several other dyestuffs of the formula I or contain these dyestuffs, and/or dyestuff component B can consist of one or more dyestuffs of the formulae III to IX or contain these dyestuffs:

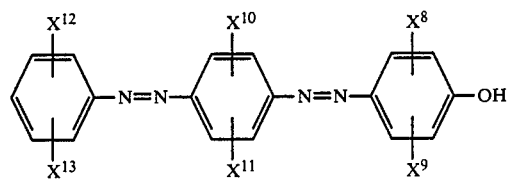 (III)

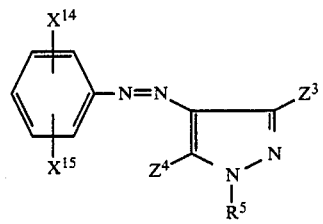 (IV)

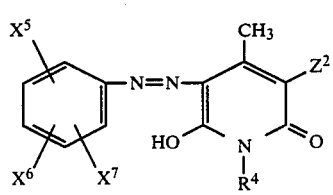 (V)

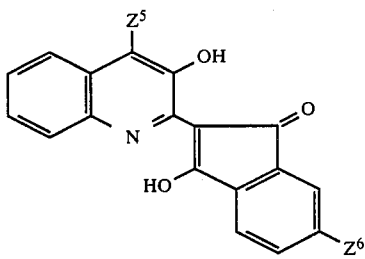 (VI)

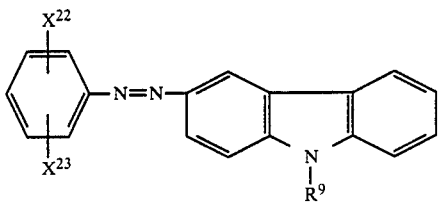 (VII)

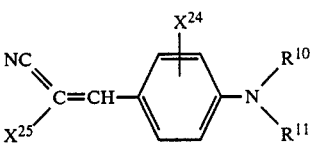 (VIII)

 (IX)

In formulae III to IX, the substituents have the following meanings: $R^5$: one of the meanings of $R^1$; $R^6$: —H; or alkyl with 1 to 4C atoms; $R^7$: —H; alkyl with 1 to 4C atoms, which can be substituted by —COOR$^{12}$, —CN, phenyl or —Cl; or alkyl with 2 to 4C atoms, substituted by hydroxyl, alkoxy with 1 to 4C atoms, phenoxy or —OCO—R$^{12}$; $R^8$: one of the meanings of $R^7$, and moreover phenyl; $R^9$: —H; alkyl with 1 to 4C atoms, which can be substituted by —COOR$^{12}$ or —CN; alkyl with 2 to 4C atoms, substituted by hydroxyl, alkoxy with 1 to 4C atoms, hydroxyalkoxy with 2 to 4C atoms, alkoxy-alkoxy with a total of 2 to 8C atoms or alkoxy-alkoxy-alkoxy with a total of 3 to 12C atoms; $R^{10}$: one of the meanings of $R^7$; $R^{11}$: —H; alkyl with 1 to 4C atoms; or alkyl with 2 to 4C atoms, substituted by —Cl or the radical Y; $R^{12}$: alkyl with 1 to 4C atoms; alkyl with 2 to 4C atoms, substituted by alkoxy with 1 to 4C atoms, phenoxy, allyloxy or —OH; $X^8$: one of the meanings of $X^1$; $X^9$: —H; or alkyl with 1 to 4C atoms; $X^{10}$: —H; alkyl with 1 to 4C atoms; alkoxy with 1 to 4C atoms; alkoxy with 2 to 4C atoms, substituted by —OH or alkoxy with 1 to 4C atoms; —F; Cl; or —Br; $X^{11}$: one of the meanings of $X^{10}$, and additionally alkylcarbonylamino with 1 to 4C atoms in the alkyl radical; or $X^{10}$ and $X^{11}$ together:

$X^{12}$: one of the meanings of $X^1$; $X^{13}$: one of the meanings of $X^2$; $X^{14}$: one of the meanings of $X^6$, and additionally optionally substituted phenoxy; $X^{15}$: one of the meanings of $X^1$, and additionally —NO$_2$ or phenylazo; $X^{16}$: —H; —NO$_2$; alkyl with 1 to 4C atoms; phenylazo; or phenylazo which is mono- or disubstituted in the phenyl nucleus by —Cl, —CH$_3$, —OCH$_3$ and/or —NO$_2$; $X^{17}$: —H; —F; —Cl, —Br; alkyl with 1 to 4C atoms; alkoxy with 1 to 4C atoms; or alkoxy with 2 to 4C atoms, substituted by alkoxy with 1 to 4C atoms; $X^{18}$: —H; —Cl; —Br, alkyl with 1 to 4C atoms; or alkylcarbonylamino with 1 to 4C atoms in the alkyl radical, which can optionally be substituted by —Cl, —Br, —OH or alkoxy with 1 to 4C atoms; $X^{19}$: —NO$_2$; —CONR$^2$R$^3$; —SO$_2$NR$^2$R$^3$ —SO$_2$—OR$^3$; —COR$^3$; —COOR$^3$; —CN; or —CF$_3$; $X^{20}$: —H; —COOR$^3$; —Cl; —Br; —CN; or —NO$_2$; $X^{21}$: —H; —Cl; or —Br; $X^{22}$: —NO$_2$; —COOR$^3$; —CONR$^2$R$^3$; —SO$_2$NR$^2$R$^3$; —COR$^3$; or —SO$_2$—OR$^3$; $X^{23}$: —H; —F; —Cl; —Br; or —CN; $X^{24}$: —H; —F; —Cl; —Br; alkyl with 1 to 4C atoms; alkoxy with 1 to 4C atoms; or alkoxy with 2 to 4C atoms, substituted by alkoxy with 1 to 4C atoms; $X^{25}$: —CN; —COOR$^3$; or CONR$^2$R$^3$; Y: —O—phenyl, the phenyl radical optionally being mono- or disubstituted by cyclopentyl, cyclohexyl, alkyl with 1 to 4C atoms and/or alkoxy with 1 to 4C atoms, —Cl and/or —Br; —CO—phenyl, the phenyl radical optionally being mono- or disubstituted by cyclopentyl, cyclohexyl, alkyl with 1 to 4C atoms and/or alkoxy with 1 to 4C atoms, —Cl and/or —Br; —O—CO—phenyl, the phenyl radical optionally being mono- or disubstituted by cyclopentyl, cyclohexyl, alkyl with 1 to 4C atoms and/or alkoxy with 1 to 4C atoms, —Cl and/or —Br; —COO—phenyl, the phenyl radical optionally being mono- or disubstituted by cyclopentyl, cyclohexyl, alkyl with 1 to 4C atoms and/or alkoxy with 1 to 4C atoms, —Cl and/or —Br; —O—COO—phenyl, the phenyl radical optionally being mono- or disubstituted by cyclopentyl, cyclohexyl, alkyl with 1 to 4C atoms and/or alkoxy with 1 to 4C atoms, —Cl and/or —Br; —O—CO—phenyl, the phenyl radical optionally being mono- or disubstituted by cyclopentyl, cyclohexyl, alkyl with 1 to 4C atoms and/or alkoxy with 1 to 4C atoms, —Cl and/or —Br; or —S-benzothiazol-2-yl; $Z^3$: alkyl with 1 to 4C atoms; —CONH$_2$; —CONH(C$_1$-C$_4$-alkyl); or —CON(C$_1$-C$_4$-alkyl)-(C$_1$-C$_4$-alkyl); $Z^4$: —OH; —NH$_2$; $Z^5$: —H; —Br; or —Cl; and $Z^6$: —H; —CONH$_2$; —CONH(C$_1$-C$_4$-alkyl) or —CON(C$_1$-C$_4$-alkyl)-(C$_1$-C$_4$-alkyl).

The alkyl, alkenyl and alkoxy radicals occurring in the substituents, including when they occur as substituents of other substituents, can be straight-chain or branched. Examples of suitable alkyl radicals, in particular for R$^1$, R$^2$, R$^3$ or R$^4$, are: methyl, ethyl, n-propyl, i-propyl, n-butyl, i-butyl, sec.-butyl, tert.-butyl, n-pentyl, i-pentyl, n-hexyl, i-hexyl, 2,3-dimethyl-butyl, n-heptyl, i-heptyl, n-octyl, i-octyl and 3-methylheptyl.

Examples of suitable alkenyl radicals for R$^1$, R$^2$, R$^3$ or R$^4$ are: allyl, methallyl, 2-butenyl, 3-butenyl, 2-pentenyl, 3-pentenyl or 4-pentenyl.

The phenyl represented by R$^2$ and/or R$^3$ can be mono- or polysubstituted, for example by —Br, —Cl and/or alkyl with 1 to 4C atoms. Monosubstitution is preferred. Preferably, only one of the two radicals R$^2$ and R$^3$ is optionally substituted phenyl or benzyl.

The phenyl radical represented by R$^1$ and/or R$^4$ can be mono- or disubstituted, for example by alkyl with 1-4C atoms and/or alkoxy with 1-4C atoms and/or —OH and/or —Cl and/or —Br. Monosubstitution is preferred.

The radical R$^1$ preferably denotes: alkyl with 1-8C atoms, alkyl with 1 to 5C atoms, which is substituted by alkoxycarbonyl with 1 to 4C atoms, in particular 1 or 2C atoms, in the alkoxy radical; or alkyl with 2 to 8C atoms, which is substituted by hydroxyl, alkoxy with 1-4C atoms or alkylcarbonyloxy with 1-4C atoms, in particular 1 or 2C atoms, in the alkyl radical.

The radical R$^1$ particularly preferably denotes: alkyl with 2 to 4C atoms, which is substituted by alkoxy with 1-4C atoms; or 2-methylcarbonyloxyethyl or 2-ethylcarbonyloxyethyl.

The radicals R$^1$ especially preferably denotes 3-(C$_1$-C$_4$)-alkoxy-n-propyl. Especially preferred dyestuff mixtures according to the invention contain 2 or 3 dyestuffs of the formula I which all have the especially preferred meaning of 3-(C$_1$-C$_4$)alkoxy-n-propyl for R$^1$. The individual radicals for R$^1$ are here chosen so that the sum of the number of carbon atoms in the alkoxy groups of the 3-(C$_1$-C$_4$)alkoxy-n-propyl radicals is at least 4 in the case of 2 dyestuffs of the formula I and at least 6 in the case of 3 or more dyestuffs of the formula I.

The radical R$^4$ preferably has one of the preferred meanings of R$^1$, and additionally denotes phenylamino or —H.

The radical R$^4$ especially preferably denotes: —H; alkyl with 1 to 4C atoms, which can be substituted by alkoxycarbonyl with 1 to 4C atoms, in particular 1 or 2C atoms; 2-ethylhexyl; or alkyl with 2 to 4C atoms, substituted by alkoxy with 1 to 4C atoms, methylcarbonyloxy or ethylcarbonyloxy.

R$^3$ in the radical —COR$^3$ represented by X$^4$ preferably denotes alkyl with 1 to 4C atoms. R$^3$ in the radical —COR$^3$ represented by X$^6$ preferably denotes phenyl, chlorophenyl or (C$_1$-C$_4$)alkyl-phenyl. Examples of such preferred radicals R$^3$ which occur in —COR$^3$ are: methyl, ethyl, n-propyl, i-propyl, n-butyl, sec.-butyl, 4-chloro-phenyl, 4-methylphenyl and, particularly preferably, 4-i-propylphenyl.

The substituents R$^2$ and R$^3$ in the radical —CONR$^2$R$^3$ represented by Z$^1$ and/or Z$^2$ and in the radicals —CONR$^2$R$^3$, —COOR$^3$, —SO$_2$NR$^2$R$^3$ and —SO$_2$—R$^3$ represented by X$^4$ and/or X$^6$ preferably have the meanings given below: alkyl with 1-8C atoms, or alkyl with 2 to 4C atoms, which is substituted by hydroxyl or alkoxy with 1 to 4 atoms or alkoxy-alkoxy with a total of 2 to 8C atoms, allyloxy or alkylcarbonyloxy with 1 to 3C atoms in the alkyl radical. Preferred radicals of this type are, for example, methyl, ethyl, n-propyl, i-propyl, n-butyl, i-butyl, sec.-butyl, 2-ethylhexyl, 2-hydroxyethyl, 3-methoxy-, 3-ethoxy-, 3-p-propoxy-, 3-i-propoxy-, 3-n-butoxy and 3-i-butoxy-propyl, 2-acetoxy-ethyl and 2-n-propoxy-ethyl. Hydrogen is also preferred for R$^2$ in the radicals —CONR$^2$R$^3$ and —SO$_2$NR$^2$R$^3$. R$^3$ in the radicals —CONR$^2$R$^3$, —SO$_2$NR$^2$R$^3$, —COOR$^3$, —SO$_2$OR$^3$ and —SO$_2$R$^3$ represented by X$^6$ is preferably also phenyl, chlorophenyl or methylphenyl. R$^2$ in combination with this is then preferably —H.

A preferred radical R$^3$ in the substituent —COOR$^3$ is furthermore furfuryl or tetrahydrofurfuryl.

—CN is preferred for the radicals Z$^1$ and/or Z$^2$.

The substituents furthermore preferably denote as follows: X$^1$ and X$^5$: —H; alkyl with 1 to 4C atoms; alkoxy with 1 to 4C atoms; alkoxy with 2 to 4C atoms, which is substituted by alkoxy with 1 to 4C atoms; —F; —Cl; or —Br; X$^2$: —H; alkyl with 1 to 4C atoms; —Cl; —Br; or —NO$_2$; or X$^1$ and X$^2$ together: also

X$^3$: —H; alkyl with 1 to 4C atoms; alkoxy with 1 to 4C atoms; alkoxy with 2 to 4C atoms, which is substituted by alkoxy with 1 or 2C atoms; —F; —Cl; or —Br; X$^4$: —H; —F; —Cl; —Br; —NO$_2$; alkyl with 1 to 4C atoms;

or —COOR³, wherein R³ denotes alkyl with 1 to 4C atoms or alkyl with 2 to 4C atoms, which is substituted by alkoxy with 1 to 4C atoms; X⁶: —H; —NO₂; —Cl; alkyl with 1 to 4C atoms; alkyl with 2 to 4C atoms, substituted by alkoxy with 1 to 4C atoms or allyloxy; SO₂NR²R³; —COR³; —CONR²R³; —SO₂NH₂; —COOR³; —OSO₂R³; —OCO—R³; or —O-SO₂NR²R³; X⁷: —H; alkyl with 1 to 4C atoms; or phenoxy; X⁸: —H; alkyl with 1 to 4C atoms; —Cl; —Br; alkoxy with 1 to 4C atoms, or alkoxy with 2 to 4C atoms, which is substituted by hydroxyl or alkoxy with 1 to 4C atoms; X⁹: —H; —Cl; or alkyl with 1 to 4C atoms; X¹⁰: —H; alkyl with 1 to 4C atoms; alkoxy with 1 to 4C atoms; or alkoxy with 2 to 4C atoms, substituted by alkoxy with 1 to 4C atoms; X¹¹: as X¹⁰, and moreover —Cl; or OH; or X¹⁰ and X¹¹ together; also

X¹²: —H; —NO₂; —OH; alkyl with 1 to 4C atoms; alkoxy with 1 to 4C atoms; alkoxy with 2 to 4C atoms, alkylcarbonylamino with 1 to 4C atoms in the alkyl radical; X¹³: —H; or alkyl with 1 to 4C atoms; X¹⁴: —H; —NO₂; alkyl with 1 to 4C atoms; alkoxy with 1 to 4C atoms; —COOR³; or —SO₂NR²R³; X¹⁵: —H; —NO₂; —Cl; or phenylazo; X¹⁶: —H; —NO₂; phenylazo or alkyl with 1 to 4C atoms; X¹⁷: —H; —Cl; —Br; —F; alkyl with 1 to 4C atoms; or alkoxy with 1 to 4C atoms; X¹⁸: —H; —Cl; alkyl with 1 to 4C atoms; or alkylcarbonylamino with 1 to 4C atoms in the alkyl radical, which can be substituted by alkoxy with 1 to 4C atoms; X¹⁹: —NO₂; alkoxycarbonyl with 1 to 4C atoms in the alkoxy radical; —SO₂N(C₁-C₄-alkyl)(C₁-C₄-alkyl); or alkoxysulphonyl with 1 to 4C atoms in the alkoxy radical; X²⁰: —H; —Cl; —Br; —CN; or —NO₂; X²¹: —H; —Cl; or —Br; X²²: —NO₂ or —Cl; X²³: —H; —F; —Cl; —Br; or alkyl with 1 to 4C atoms; X²⁴: —H, —Cl; alkyl with 1 to 4C atoms; or alkoxy with 1 to 4C atoms; X²⁵: —CN; or alkoxycarbonyl with 1 to 4C atoms, which can be substituted by alkoxy with 1 to 4C atoms, phenoxy or phenyl; R⁵: —H; alkyl with 1 to 4C atoms; phenyl; hydroxyphenyl; 1,1-dioxo-tetrahydro-thiophen-3-yl; or alkyl with 2 to 4C atoms, substituted by phenylaminocarbonyloxy; R⁷: —H; alkyl with 1 to 4C atoms; benzyl; (C₁-C₄)alkoxy-carbonyl-(C₁-C₄)alkyl; or alkyl with 2 to 4C atoms, which is preferably substituted in the end position by hydroxyl, (C₁-C₄alkyl)-carbonyloxy, —CN, —Cl, phenyl, C₁-C₄-alkoxy, phenoxy, (C₁-C₄-alkoxy)-carbonyloxy or phenoxy(C₁-C₄-alkyl)-carbonyloxy; R⁸: one of the meanings of R⁷, with the exception of —H, and moreover also phenyl or benzyl; R⁹ and R¹⁰: —H; or alkyl with 1 to 4C atoms; R¹¹: 2-(phenoxy)ethyl; 2-(cyclohexyl- or cyclopentyl-phenoxy)-ethyl; 2-(dichlorophenylaminocarbonyloxy)-ethyl; 2-(phenylaminocarbonyloxy)-ethyl; 2-chloroethyl or —(CH₂)₂-S-benzothiazol-2-yl; and Z³: alkyl with 1 to 4C atoms or —CONH₂.

The substituents particularly preferably denote as follows: X¹: —H; —Cl; —F; methyl or methoxy; X²: —H; —Cl; —NO₂ or methyl; X³: —H; methyl; methoxy; ethoxy; —F; —Cl or —Br; X⁴: —H; —Cl; methyl;  —NO₂;  —COOCH₃;  —COOC₂H₅; —COO(CH₂)₂OCH₃ or —COO(CH₂)₂OC₂H₅; X⁵: —H; —Cl; methyl or methoxy; X⁶: —H; —Cl; —NO₂; methyl-;  —SO₂NH₂;  —CONH(C₂-C₈-alkyl); —COO(C₂-C₈-alkyl); —SO₂NH((₂-C₈-alkyl); furylmethoxycarbonyl;  —COO(CH₂)₂OCH₂CH=CH₂; benzylcarbonyloxy; —OSO₂-C₆H₅; —OSO₂— N(CH₃)₂; or —CO—C₆H₅, it also being possible for the phenyl radical to besubstituted by alkyl with 1 to 4C atoms; —COOC₂C₆H₅; —COO(CH₂)₂CH₂)₂OCH₃; X⁷, X⁸, X⁹ and X¹³: —H; or methyl; X¹⁰: —H; methyl or methoxy; X¹¹: —H; methyl, methoxy; —Cl; or —OH; or X¹⁰ and X¹¹ together:

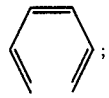

X¹²: —H; methyl; methoxy; —NO₂; —OH, 2-hydroxyethoxy; or acetylamino; X¹⁴: —H; methyl; methoxy; —NO₂; —COOCH₃; —SO₂N(C₁-C₂-alkyl)-(C₁-C₂-alkyl); X¹⁵: —H; —NO₂; —Cl; or phenylazo; X¹⁶: —H; —NO₂; or phenylazo; X¹⁷: —H; or methyl; X¹⁸: —H; —Cl; methyl; or acetylamino; X¹⁹: —NO₂; methoxycarbonyl or dimethylaminosulphonyl; X²⁰: —H; —Cl; —Br; or —CN; X²¹: —H; —Cl; or —Br; X²²: —NO₂; X²³: —H; —Cl; or —Br; X²⁴: —H; —Cl; methyl; or methoxy; X²⁵: —CN; R⁵: —H; phenyl; hydroxyphenyl; 2-(phenylaminocarbonyl)-ethyl; or 1,1-dioxo-tetrahydro-thiophen-3-yl; R⁶: —H; or methyl; R⁷: —H; methyl; ethyl; propyl; butyl; 2-hydroxyethyl; 2-cyanoethyl; 2-chloroethyl; 2-acetyloxy-ethyl; 2-(methoxycarbonyl)-ethyl; 2-(phenoxymethylcarbonyloxy)-ethyl; 2-(methylcarbonyloxy)-ethyl; 2-(ethylcarbonyloxy)-ethyl; R⁸: —H; phenyl; 2-cyanoethyl; 2-hydroxyethyl; 2-(ethylcarbonyloxy)-ethyl or 2-(methoxycarbonyl)-ethyl; R¹¹: 2-(phenoxy)-ethyl; 2-(4-cyclohexyl-phenoxy)-ethyl; 2-(3,4-dichlorophenylaminocarbonyloxy)-ethyl; 2-(phenylaminocarbonyloxy)-ethyl or 2-chloro-ethyl; Z³: methyl; or —CONH₂; Z⁴: —OH; or —NH₂; and Z⁵: —H or —Br.

If the same R, Z or X substituents occur in a dyestuff or two or more different dyestuffs, this does not automatically mean that these substituents are identical in meaning. As a rule, this is not the case.

In the preferred dyestuffs of the formulae I to IX, several, in particular all, of the radicals have the preferred meanings given. In the particularly preferred dyestuffs, several, in particular all, of the radicals have the particularly preferred mean-ings given, and in the especially preferred dyestuffs, several, in particular all, of the radicals have the especially preferred meanings given.

The dyestuffs of the general formula I to IX are known or can easily be prepared by processes which are known for the preparation of the dyestuffs of these classes.

Examples of preferred dyestuffs of the formulae I to IX are given in the following Tables 1 to 9. Alkyl radicals without further details here are straight-chain alkyl radicals. Isoalkyl radicals are characterized by the addition of "i". In the formulae of the dyestuffs I, III, VII and IX, the substituents have been numbered in accordance with the following designations:

Dyestuff I: 5-((4-phenylazo)-phenylazo)-6-hydroxypyrid-2-one.
Dyestuff III: 4-((4-phenylazo)-phenylazo)-phenol.
Dyestuff VII: 4-phenylazo-R⁵,R⁶-substituted aniline.
Dyestuff IX: 4-(2-cyano-vinyl)-R¹⁰,R¹¹-substituted-aniline.

Table 1

Examples of preferred dyestuffs of the formula I:

$$\text{Structure (I): } X^3, X^4\text{-substituted phenyl–N=N–}X^1,X^2\text{-substituted phenyl–N=N–pyridone with CH}_3, Z^1, \text{HO, N-R}^1, \text{=O substituents}$$

for $Z^1 = -CN$

| $R^1$ | $X^1$ | $X^2$ | $X^3$ | $X^4$ |
|---|---|---|---|---|
| H | H | H | H | H |
| H | H | H | 4-CH$_3$ | H |
| H | H | 2-NO$_2$ | H | H |
| H | 2-CH$_3$ | 5-CH$_3$ | H | H |
| H | H | H | 3-Cl | H |
| CH$_3$ | H | H | H | H |
| CH$_3$ | 2-CH$_3$ | H | 2-CH$_3$ | H |
| CH$_3$ | H | H | 4-Cl | H |
| CH$_3$ | 2-CH$_3$ | H | 3-Cl | H |
| CH$_3$ | 2-OCH$_3$ | H | H | H |
| CH$_3$ | 2-CH$_3$ | H | H | H |
| C$_2$H$_5$ | H | H | H | H |
| C$_2$H$_5$ | H | 2-NO$_2$ | H | H |
| C$_2$H$_5$ | 2-OCH$_3$ | H | 4-Cl | H |
| C$_2$H$_5$ | 3-CH$_3$ | H | H | H |
| C$_3$H$_7$ | 2-Cl | H | 3-CH$_3$ | H |
| C$_3$H$_7$ | 3-OCH$_3$ | H | H | H |
| C$_4$H$_9$ | H | H | H | H |
| C$_4$H$_9$ | H | H | H | COOC$_2$H$_5$ |
| C$_4$H$_9$ | 2-CH$_3$ | H | 4-Cl | H |
| C$_4$H$_9$ | H | H | 2-Cl | H |
| i-C$_4$H$_9$ | 2-CH$_3$ | 5-CH$_3$ | 4-CH$_3$ | H |
| CH$_2$CH(C$_2$H$_5$)C$_4$H$_9$ | H | H | 4-OCH$_3$ | H |
| CH$_2$CH(C$_2$H$_5$)C$_4$H$_9$ | H | H | H | H |
| CH$_2$CH(C$_2$H$_5$)C$_4$H$_9$ | 2-Cl | H | H | H |
| (CH$_2$)$_3$OCH$_3$ | H | H | H | H |
| (CH$_2$)$_3$OCH$_3$ | H | 2-NO$_2$ | H | H |
| (CH$_2$)$_3$OCH$_3$ | 3-CH$_3$ | H | 3-Cl | H |
| (CH$_2$)$_3$OCH$_3$ | 2-OCH$_3$ | H | H | H |
| (CH$_2$)$_3$OCH$_3$ | H | H | 4-F | H |
| (CH$_2$)$_3$OCH$_3$ | 2-CH$_3$ | 5-CH$_3$ | H | H |
| (CH$_2$)$_3$OCH$_3$ | 2-Cl | H | 3-Cl | H |
| (CH$_2$)$_3$OCH$_3$ | H | H | 4-CH$_3$ | H |
| (CH$_2$)$_3$OCH$_3$ | H | H | 4-OC$_2$H$_5$ | H |
| (CH$_2$)$_3$OC$_2$H$_5$ | H | H | H | H |
| (CH$_2$)$_3$OC$_2$H$_5$ | 3-CH$_3$ | H | H | H |
| (CH$_2$)$_3$OC$_2$H$_5$ | 2-CH$_3$ | 5-Cl | H | H |
| (CH$_2$)$_3$OC$_2$H$_5$ | 2-OCH$_3$ | H | H | H |
| (CH$_2$)$_3$OC$_2$H$_5$ | 3-CH$_3$ | H | 4-Cl | H |
| (CH$_2$)$_3$OC$_2$H$_5$ | H | H | 3-CH$_3$ | 5-CH$_3$ |
| (CH$_2$)$_3$OC$_3$H$_7$ | H | H | H | H |
| (CH$_2$)$_3$OC$_3$H$_7$ | 2-Cl | H | H | H |
| (CH$_2$)$_3$OC$_3$H$_7$ | 2-CH$_3$ | 5-CH$_3$ | 4-Cl | H |
| (CH$_2$)$_3$O—i-C$_3$H$_7$ | H | H | H | H |
| (CH$_2$)$_3$O—i-C$_3$H$_7$ | 2-OCH$_3$ | H | 4-Cl | H |
| (CH$_2$)$_3$O—i-C$_3$H$_7$ | 3-CH$_3$ | H | H | H |
| (CH$_2$)$_3$O—i-C$_3$H$_7$ | 3-CH$_3$ | H | 3-CH$_3$ | H |
| (CH$_2$)$_3$O—i-C$_3$H$_7$ | H | H | H | 4-COO(CH$_2$)$_2$OC$_2$H$_5$ |
| (CH$_2$)$_3$O—i-C$_3$H$_7$ | H | H | 3-Cl | H |
| (CH$_2$)$_3$OC$_4$H$_9$ | H | H | H | H |
| (CH$_2$)$_3$OC$_4$H$_9$ | 3-Cl | H | H | H |
| (CH$_2$)$_3$OC$_4$H$_9$ | 2-CH$_3$ | H | 4-Br | H |
| (CH$_2$)$_3$OC$_4$H$_9$ | 2-CH$_3$ | H | 2-CH$_3$ | H |
| (CH$_2$)$_2$OH | H | H | H | H |
| (CH$_2$)$_2$OCO—CH$_3$ | 3-CH$_3$ | H | H | H |
| (CH$_2$)$_4$OCO—C$_2$H$_5$ | 2-CH$_3$ | H | 2-Br | H |
| (CH$_2$)$_2$OCH$_3$ | H | H | 2-Cl | 4-Cl |
| CH$_2$COOCH$_3$ | 2-CH$_3$ | H | H | H |
| CH$_2$COOC$_2$H$_5$ | H | H | H | H |
| CH$_2$COOC$_2$H$_5$ | 3-CH$_3$ | H | H | H |
| (CH$_2$)$_3$OCH$_3$ | 2-CH$_3$ | H | H | 3-NO$_2$ |

Table 2

Examples of preferred dyestuffs of the formula II:

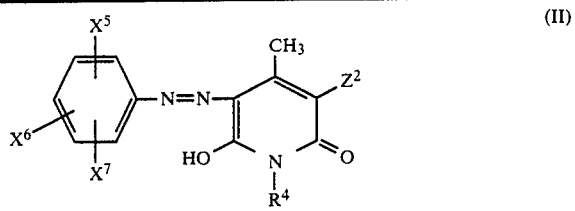

(II)

for $Z^2 = -CN$

| $R^4$ | $X^5$ | $X^6$ | $X^7$ |
|---|---|---|---|
| H | H | 4-$NO_2$ | 2-$CH_3$ |
| H | H | 4-CO—$C_6H_4$—4'-i-$C_3H_7$ | H |
| H | H | 3-$OSO_2$—$N(CH_3)_2$ | H |
| H | H | H | H |
| H | H | 4-$CH_3$ | H |
| H | 4-$OCH_3$ | 2-$NO_2$ | H |
| H | 4-$CH_3$ | 2-$NO_2$ | H |
| H | H | 4-$SO_2NH_2$ | H |
| H | 5-Cl | 2-Cl | H |
| $CH_3$ | H | 3-$OSO_2$—$C_6H_5$ | H |
| $CH_3$ | H | 4-$CONHCH_2CH(C_2H_5)C_4H_9$ | H |
| $CH_3$ | 4-Cl | 3-Cl | H |
| $C_2H_5$ | H | 4-$COOCH_2CH(C_2H_5)C_4H_9$ | H |
| $C_2H_5$ | H | 4-$COO(CH_2)_2O(CH_2)_2OCH_3$ | H |
| $C_2H_5$ | 4-Cl | 2-$NO_2$ | H |
| $C_2H_5$ | H | 3-$NO_2$ | H |
| $C_3H_7$ | 4-Cl | 2-$NO_2$ | H |
| $C_4H_9$ | 4-Cl | 2-$NO_2$ | H |
| $C_4H_9$ | H | 4-$COOCH_2C_6H_5$ | H |
| $C_4H_9$ | H | 4-$SO_2NHCH_2CH(C_2H_5)C_4H_9$ | H |
| $C_4H_9$ | H | 4-COOCH$_2$—  | H |
| 4-$CH_2CH(C_2H_5)C_4H_9$ | H | 2-$NO_2$ | H |
| 4-$CH_2CH(C_2H_5)C_4H_9$ | 4-$OCH_3$ | 2-$NO_2$ | H |
| $CH_2COOC_2H_5$ | H | 4-$COO(CH_2)_2OCH_2CH=CH_2$ | H |
| —$NHC_6H_5$ | H | 3-Cl | H |
| —$NHC_6H_5$ | 4-Cl | 3-Cl | H |
| $(CH_2)_3OCH_3$ | H | 4-$SO_2OC_6H_5$ | H |
| $(CH_2)_3OCH_3$ | H | 3-$OCO$—$CH_2C_6H_5$ | H |
| $(CH_2)_3OCH_3$ | H | 3-$OCOOCH_2C_6H_5$ | H |

Table 3

Examples of preferred dyestuffs of the formula III:

(III)

| $X^8$ | $X^9$ | $X^{10}$ | $X^{11}$ | $X^{13}$ | $X^{12}$ |
|---|---|---|---|---|---|
| H | H | H | H | H | H |
| 2-$CH_3$ | H | H | H | H | H |
| H | H | 2-$CH_3$ | H | 2-$CH_3$ | H |
| H | H | 2-$OCH_3$ | H | 2-$OCH_3$ | H |
| H | H | ⌬ | H | H | H |
| H | H | 2-$OCH_3$ | 5-$OCH_3$ | H | H |
| H | H | 2-$OCH_3$ | 5-$CH_3$ | H | H |
| 2-$CH_3$ | H | 2-$CH_3$ | 5-$CH_3$ | 4-$NO_2$ | H |
| H | H | 2-$OCH_3$ | H | 4-$NO_2$ | H |
| H | H | 2-$OCH_3$ | 5-$CH_3$ | 4-$NO_2$ | H |
| H | H | 2-$OCH_3$ | 5-$OCH_3$ | 4-$NO_2$ | H |
| H | H | H | H | 4-OH | H |
| 2-$CH_3$ | H | H | 3-Cl | 4-OH | 3-$CH_3$ |
| 2-$CH_3$ | H | H | H | 4-OH | 3-$CH_3$ |
| H | H | 2-$OCH_3$ | 5-OH | 4-$O(CH_2)_2OH$ | H |
| H | H | 3-$CH_3$ | H | 4-$NHCOCH_3$ | H |

Table 4

Examples of preferred dyestuffs of the formula IV:

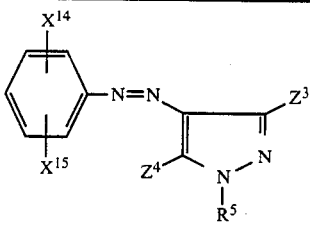

(IV)

| $Z^3$ | $Z^4$ | $R^5$ | $X^{14}$ | $X^{15}$ |
|---|---|---|---|---|
| $CH_3$ | OH | $C_6H_5$ | 4-$COOCH_3$ | H |
| $CH_3$ | OH | $C_6H_5$ | 4-$CH_3$ | 2-$NO_2$ |
| $CH_3$ | OH | 3-OH—$C_6H_4$ | H | 4-$C_6H_5$—N=N— |
| $CH_3$ | OH | H | 5-$OCH_3$ | 2-$NO_2$ |
| $CH_3$ | OH | $(CH_2)_2OCONHC_6H_5$ | 4-$NO_2$ | 2-Cl |
| $CH_3$ | OH | 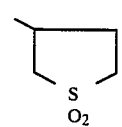 | 4-$NO_2$ | 2-Cl |
| $CH_3$ | $NH_2$ | $C_6H_5$ | 4-$SO_2N(C_2H_5)CH_3$ | 2-$NO_2$ |
| $CH_3$ | $NH_2$ | $C_6H_5$ | 4-$NO_2$ | 2-$NO_2$ |
| $CH_3$ | $NH_2$ | H | 4-$CH_3$ | 2-$NO_2$ |
| $CONH_2$ | OH | $C_6H_5$ | H | 4-$C_6H_5$—N=N— |

Table 5

Examples of preferred dyestuffs of the formula V:

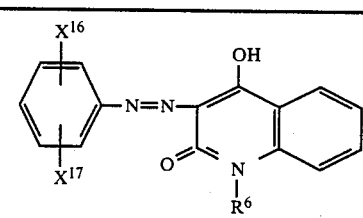

(V)

| $R^6$ | $X^{16}$ | $X^{17}$ |
|---|---|---|
| H | 3-$NO_2$ | H |
| H | 4-$C_6H_5$—N=N | H |
| $CH_3$ | 3-$NO_2$ | H |

Table 6

Examples of preferred dyestuffs of the formula VI:

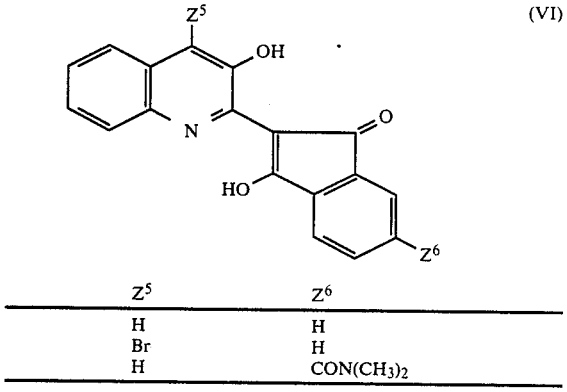

(VI)

| $Z^5$ | $Z^6$ |
|---|---|
| H | H |
| Br | H |
| H | $CON(CH_3)_2$ |

Table 7

Examples of preferred dyestuffs of the formula VII:

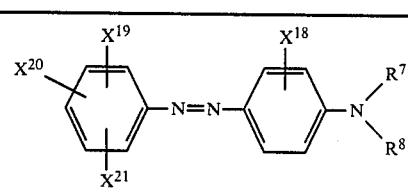

(VII)

| $X^{18}$ | $X^{19}$ | $X^{20}$ | $X^{21}$ | $R^7$ | $R^8$ |
|---|---|---|---|---|---|
| H | 4-$NO_2$ | H | H | H | H |
| H | 4-$NO_2$ | H | H | H | $C_6H_5$ |
| H | 4-$NO_2$ | H | H | $CH_3$ | $(CH_2)_2CN$ |
| H | 4-$NO_2$ | H | H | $C_2H_5$ | $(CH_2)_2CN$ |
| H | 4-$NO_2$ | H | H | $C_4H_9$ | $(CH_2)_2CN$ |
| H | 4-$NO_2$ | H | H | $(CH_2)_2OH$ | $(CH_2)_2CN$ |
| H | 4-$NO_2$ | H | H | $(CH_2)_2OCO$—$CH_3$ | $(CH_2)_2CN$ |
| H | 4-$NO_2$ | H | H | $(CH_2)_2OCO$—$CH_2OC_6H_5$ | $(CH_2)_2CN$ |
| H | 4-$NO_2$ | 2-Cl | H | $(CH_2)_2CN$ | $(CH_2)_2CN$ |
| 3-$NHCOCH_3$ | 4-$COOCH_3$ | H | H | $(CH_2)_2OCO$—$C_2H_5$ | $(CH_2)_2OCO$—$C_2H_5$ |
| 3-$CH_3$ | 4-$NO_2$ | 2-Cl | H | $(CH_2)_2CN$ | $(CH_2)_2CN$ |

-continued

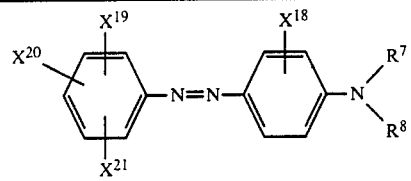

(VII)

| $X^{18}$ | $X^{19}$ | $X^{20}$ | $X^{21}$ | $R^7$ | $R^8$ |
|---|---|---|---|---|---|
| 2-Cl | 4-$NO_2$ | 2-CN | H | H | $(CH_2)_2CN$ |
| H | 4-$NO_2$ | 2-Cl | 6-Cl | $C_2H_5$ | $(CH_2)_2CN$ |
| H | 4-$NO_2$ | 2-Cl | 6-Cl | $CH_3$ | $(CH_2)_2OH$ |
| H | 4-$NO_2$ | 2-Cl | 6-Cl | $(CH_2)_2OH$ | $(CH_2)_2OH$ |
| H | 4-$NO_2$ | 2-Cl | 6-Cl | $(CH_2)_2OCO-CH_3$ | $(CH_2)_2CN$ |
| H | 4-$NO_2$ | 2-Cl | 6-Cl | $(CH_2)_2Cl$ | $(CH_2)_2CN$ |
| H | 4-$NO_2$ | 2-Br | 6-Br | $C_2H_5$ | $(CH_2)_2CN$ |
| 3-Cl | 4-$NO_2$ | 2-Br | 6-Br | $(CH_2)_2OH$ | $(CH_2)_2OH$ |
| 3-Cl | 4-$NO_2$ | 2-Br | 6-Cl | $(CH_2)_2OH$ | $(CH_2)_2OH$ |
| H | 4-$NO_2$ | 2-Br | 6-Cl | $(CH_2)_2COOCH_3$ | $(CH_2)_2COOCH_3$ |
| H | 4-$SO_2N(CH_3)_2$ | 2-Cl | 5-Cl | $C_2H_5$ | $(CH_2)_2CN$ |

Table 8

Examples of preferred dyestuffs of the formula VIII:

(VIII)

| $X^{22}$ | $X^{23}$ | $R^9$ |
|---|---|---|
| 4-$NO_2$ | 2-Cl | H |
| 4-$NO_2$ | 2-Br | $C_2H_5$ |
| 4-$NO_2$ | 2-Cl | $CH_3$ |
| 4-$NO_2$ | 2-Br | $C_4H_9$ |

Table 9

Examples of preferred dyestuffs of the formula IX:

(IX)

| $X^{24}$ | $X^{25}$ | $R^{10}$ | $R^{11}$ |
|---|---|---|---|
| 2-$CH_3$ | CN | $C_2H_5$ | $(CH_2)_2OC_6H_4$—4-cyclohexyl |
| 2-$CH_3$ | CN | $C_4H_9$ | $(CH_2)_2OCONH(3.4\text{-di-Cl}-C_6H_3)$ |
| 3-$CH_3$ | CN | $C_2H_5$ | $(CH_2)_2OCONHC_6H_5$ |
| H | $COOC_2H_5$ | $C_4H_9$ | $(CH_2)_2Cl$ |
| 3-$CH_3$ | CN | $C_2H_5$— | $(CH_2)_2$—S—benzothiazol-2-yl |

In the dyestuff mixtures according to the invention, component A consists of a dyestuff of the formula I and component B consists of one or more other dyestuffs from the series of yellow, golden yellow or yellow-brown disperse dyestuffs from the series comprising monoazo, disazo or methine dyestuffs, in particular of one or more other dyestuffs of the formula I and/or one or more dyestuffs of the formula II to IX.

Dyestuff mixtures, according to the invention, in which component B contains a dyestuff of the formula I, II, III, IV, V or VI or consists of such a dye-stuff are preferred.

Dyestuff mixtures according to the invention in which component B contains one or more dyestuffs of the formula I and/or II are particularly preferred, especially if component B consists of one or more dyestuffs of the formula I or II. Dyestuff mixtures according to the invention which contains at least two preferred dyestuffs of the formula I or one preferred dyestuff of the formula I and at least one preferred dyestuff of the formula II are especially preferred.

The dyestuff mixtures according to the invention contain or consist of the two dyestuff components A and B. In addition to dyestuff components A and B, the dyestuff mixtures according to the invention can also contain formulating agents and/or auxiliaries, and if appropriate in addition other dyestuffs.

The dyestuff mixtures according to the invention can be in powder form or in paste form. The pulverulent dyestuff formulations usually have a dyestuff content of 30 to 50% by weight. The remainder consists of formulating agents and/or auxiliaries, such as, for example, dispersing agents, wetting agents, emulsifiers, dust removal agents and the like. The paste-like dyestuff formulations in aqueous suspension usually have a dyestuff content of 20 to 50% by weight and a formulating agent and/or auxiliary content of 20 to 30% by weight, the remainder being water. As auxiliaries, the paste-like dyestuff formulations may also contain, in addition to dispersing agents, emulsifiers and wetting agents, in addition agents which delay drying out, such as, for example, glycols or glycerol, and preservatives of fungicides.

The dyestuff mixtures according to the invention can be prepared by various processes, thus, for example, by mixing already finished individual dyestuffs of components A and B or by mixing unfinished individual dyestuffs of components A and B and carrying out the finishing subsequently or during the mixing operation. Mixing of unfinished individual dyestuffs of components A and B is preferably carried out with the addition of dispersing agents and, if appropriate, other auxiliaries. This mixing process is advantageously carried out in connection with the wet comminution at temperatures of 0° to 190° C., advantageously in suitable mills, for example colloid, ball, bead or sand mills, or dispersion kneaders, which is to be carried out for finishing disperse dyestuffs, but can also be effected, in particular, on the already finished individual dyestuffs by mixing manually or by stirring into dispersing agents or dye liquors or by incorporating into printing pastes.

On wet comminution of the dyestuffs, the dyestuffs are suspended in a liquid medium, preferably in water, together with dispersing agents and the mixture is exposed to the action of shearing forces. The dyestuff particles originally present are thus comminuted mechanically until an optimum specific surface area is achieved and sedimentation of the dyestuffs is as low as possible. The particle size of the dyestuffs is in general about 0.1 to 10 μm.

The dispersing agents also used on wet comminution can be non-ionic or anionic. Examples of non-ionic dispersing agents are reaction products of alkylene oxides, such as, for example, ethylene oxide or propylene oxide, with compounds which can be alkylated, such as, for example, fatty alcohols, fatty acids, phenols, alkylphenols and carboxylic acid amides. Examples of anionic dispersing agents are lignin-sulphonates, alkyl- or alkyl-aryl sulphonates and alkylaryl polyglycol ether-sulphates.

The dyestuff dispersions obtained on wet comminution should be pourable for most methods of use and can also additionally contain other auxiliaries, for example those which act as oxidizing agents, such as, for example, sodium m-nitrobenzenesulphonate, or fungicidal agents, such as, for example, sodium o-phenyl-phenolate and sodium penta-chlorophenolate.

The dyestuff dispersions thus obtained can very advantageously be used for preparing printing pastes and dye liquors. They offer particular advantages, for example, in continuous processes in which the dyestuff concentration of the dye liquors must be kept constant by continuously feeding dyestuff into the running apparatus.

Powder formulations are preferred for certain fields of use. These powders contain the dyestuffs, dispersing agents and other auxiliaries, such as, for example, wetting agents, oxidizing agents, preservatives and dust removal agents.

A process for the preparation of pulverulent dyestuff formulations comprises withdrawing the liquid from the liquid dyestuff dispersions described above, for example by vacuum drying, freeze-drying, drying on drum driers or, preferably, by spray-drying.

If the dyestuff mixtures are to be used for textile printing, the required amounts of the dyestuff formulations are kneaded together with thickeners, such as, for example, alkali metal alginates or the like, and, if appropriate, other additives, such as fixing accelerators, wetting agents and oxidizing agents, to give printing pastes.

Dyestuff mixtures according to the invention in which component B consists of a dyestuff of the formula I or II can also be prepared by a process in which, during the preparation of the dyestuff of the formula I or II, the dyestuff of the formula I of component A is simultaneously formed by diazotization and subsequent coupling. That is to say, joint diazotization of two diazo components and subsequent coupling to one or a mixture of two different coupling components is carried out, or one diazo component is diazotized and then coupled to a mixture of two different coupling components. The diazotization and coupling are thereby carried out in a manner which is known per se and the mixture of the dyestuffs can be isolated and dried in the customary manner, and converted into a pulverulent or paste-like formulation in the manner already mentioned.

The dyestuff mixtures according to the invention can also be shaded with small amounts (less than 10 parts by weight) of dyestuffs of the red or blue range.

The dyestuff mixtures according to the invention are outstandingly suitable for dyeing and printing hydrophobic synthetic fibre materials. Surprisingly, the dyestuff mixtures according to the invention are superior to the individual dyestuffs in respect of dyeing properties and coloristic propeties. The dyestuff mixtures according to the invention have an outstanding levelling capacity and an excellent exhaustion capacity, and the dyeings and prints produced with them have, for example, a very good light-fastness in the yellow and trichromatic range, a high fastness to sublimation, fastness to dry heat-setting and pleating and an exceptionally good thermomigration. The dyeings and prints produced with the dyestuff mixtures according to the invention furthermore have a good pH-stability between pH 3 and 8 and a high insensitivity towards reducing substances in the dyebath. Moreover, outstandingly deep dyeings with excellent exhaustion of the bath are also obtained with the dyestuff mixtures according to the invention, including when the dyeing temperatures are reduced. The dyestuff mixtures according to the invention are also particularly suitable for the production of mixed shades together with other dyestuffs.

Examples of possible hydrophobic synthetic materials are: cellulose 2½-acetate, cellulose triacetate, polyamides and, in particular, high molecular weight polyesters and mixtures thereof with natural fibre materials, such as, for example, cotton, regenerated cellulose fibres or wool.

Possible high molecular weight polyester fibres are, in particular, those based on polyethylene terephthalate, polybutylene terephthalate, polycyclohexylene terephthalate or polyhydroxypropylene terephthalate, as well as modified polyester fibres, such as are obtained, for example, by copolymerization with polyethylene glycol, glycerol, isophthalic aic or phosphorus compounds.

The contents of hydrophobic material, in particular polyester, in mixtures of hydrophobic fibre materials with wool, regenerated cellulose or cotton can be 10 to 90% by weight, in particular 30 to 70% by weight.

To prepare the dye liquors, the required amounts of the dyestuff formulations are diluted with the dyeing medium, preferably with water, until a liquor ratio of 1:5 to 1:50 results for the dyeing. Other dyeing auxiliaries, such as dispersing agents, wetting agents and fixing auxiliaries, are in general also added to the liquors.

The dyestuff mixtures according to the invention are preferably employed for dyeing and printing materials made of high molecular weight polyesters, in particular

EXAMPLE 1

(a) 50 parts of the dyestuff of the formula X

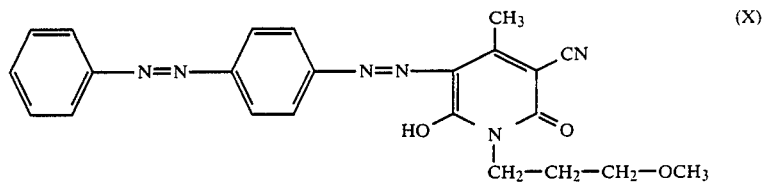

those based on polyethylene glycol terephthalates or mixtures thereof with natural fibre materials, or materials made of cellulose triacetate. These materials can be, for example, in the form of sheet-like, flock-like or thread-like structures and can be processed, for example, to yarns or woven or knitted textile materials. Dyeing of the fibre material mentioned with the dyestuff mixtures according to the invention is carried out in a manner which is known per se, preferably from aqueous suspension, if appropriate in the presence of carriers, between 80° and about 125° C. by the exhaustion process, or in the absence of carriers by the HT process in a dyeing autoclave at about 110° to 140° C., or by the so-called thermosol process, in which the goods are padded with the dye liquor and the dyestuff is then fixed at about 175° to 230° C. Printing of the materials mentioned can be carried out by treating the goods which have been printed with printing pastes containing dyestuff mixtures according to the invention at temperatures between about 110° and 230° C. with HT steam, pressurized steam or dry heat to fix the dyestuff, if appropriate in the presence of a carrier.

The actual dyeing operation can advantageously be followed by a reductive after-treatment, or an after-treatment assisted by dispersing agents, to remove portions of dyestuff which have not been completely fixed.

When blends of polyester fibres with wool, cotton or regenerated cellulose are used, the admixed fibre can be dyed with suitable dyestuffs, in the same or a different colour shade (mixtures, woven patterns), before or after dyeing of the polyester.

The dyestuff mixtures according to the invention can also advantageously be employed together with other dyestuffs, such as, for example, also red or blue dyestuffs. The other dyestuffs can thereby already be contained in the formulation of the dyestuff mixture according to the invention, or they can be co-used only when the dyeing is carried out, in the sense of a combination.

The use of the dyestuff mixtures according to the invention for dyeing by the HT or thermosol process is preferred.

Unless indicated otherwise, parts in the examples given below denote parts by weight and percentages denote percentages by weight.

(prepared according to German Patent A1-1,917,278) and 50 parts of the dyestuff of the formula XI

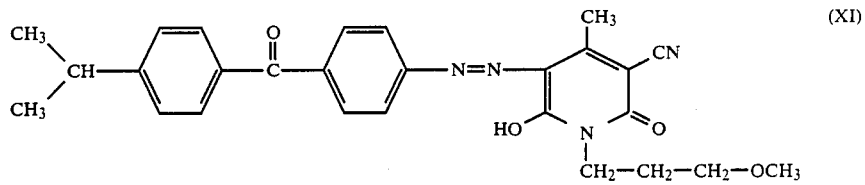

(prepared according to German Patent A1-1,901,711) are mixed with one another and finely dispersed in the presence of water in a bead mill, with the addition of twice the amount of a commercially available dispersing agent from the lignin-sulphonate series. The resulting dispersion is then dried.

(b) Using the resulting dyestuff preparation, HT dyeings are produced on polyester in accordance with the following instructions:

x g of the dyestuff preparation (calculated as pure dyestuff) are stirred into 2,000 g of water and 4.0 g of ammonium sulphate and 2.0 g of a commercially available dispersing agent based on a naphthalsulfonic acid/-formaldehyde condensate are added, and the pH value is brought to 5 with acetic acid.

100 g of a polyester fabric based on polyethylene glycol terephthalate are introduced into the dye liquor thus obtained and dyeing is carried out at 130° C. for 30 minutes.

The bath exhaustions shown below are obtained when the amounts shown below (calculated as pure dyestuff), based on the weight of polyester, are used. For comparison, the bath exhaustions are determined in an analogous manner for the individual dyestuffs X and XI. The following results are obtained:

|  | Amount used | Dyebath exhaustion |
|---|---|---|
| Dyestuff mixture, | 0.1% | 97% |
| according to the invention, | 0.2% | 96% |
| of dyestuffs X and XI | 0.5% | 95% |
|  | 1% | 79% |
| Dyestuff X | 0.1% | 97% |
|  | 0.2% | 77% |
|  | 0.5% | 43% |
| Dyestuff XI | 0.1% | 97% |
|  | 0.2% | 75% |
|  | 0.5% | 50% |

EXAMPLE 2

(a) A fine dyestuff dispersion is prepared from 50 parts of the dyestuff of the formula X

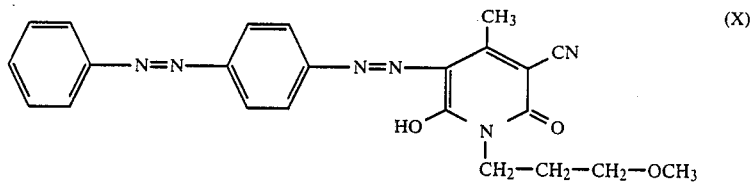

and 50 parts of the dyestuff C.I. Disperse Yellow 227 of the formula XII

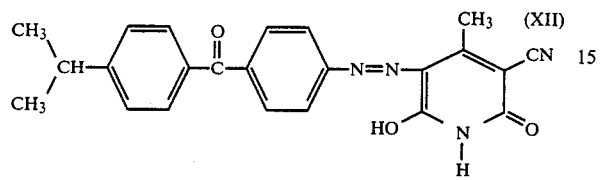

and 150 parts of a dispersing agent from the lignin-sulphonate series known in practice, by aqueous grinding in bead mill, and this dispersion is then dried by spray-drying.

(b) For the subsequent dyeing, 100 parts of a polyester fibre (polyethylene terephthalate type) are used and this is introduced, as a yarn, into a dyeing beaker containing 2,000 parts of water at 60° C., 2 parts of crystalline sodium acetate, 3 parts of 30% strength acetic acid and 1 part of the dyestuff preparation described above. The mixture is warmed to 128°–130° C. in the course of 30 minutes and dyeing is carried out at this temperature for 30 minutes. The yarn is then cooled, rinsed and dried. A clear, golden yellow dyeing with high light-fastness is obtained, with a scarcely noticeable residual dyestuff content in the dyebath which remains.

The use of a different dispersing agent, which is customary in practice, to prepare the dyestuff preparation leads to the same dyeing result.

EXAMPLE 3

Dyestuff preparations are prepared as described in Example 2 using the following mixing ratios of the dyestuffs:

|     | Dyestuff XII | Dyestuff X |
| --- | --- | --- |
| (a) | 90 parts | 10 parts |
| (b) | 20 parts | 80 parts |

Subsequent dyeing on polyester fibre material gives equivalent dyeing results to those in Example 2.

EXAMPLE 4

100 parts of a polyester fibre (polyethylene terephthalate type, modified with polybutylene terephthalate contents) are used and the procedure is otherwise as described in Example 2. A very good dyebath exhaustion and a good depth of colour on the polyester material are likewise obtained here.

An equally good result is obtained if a polyester fibre (polyethylene terephthalate type, modified with polyethylene glycol contents) is used.

EXAMPLE 5

A finely divided dyestuff preparation is prepared from 50 parts of a dyestuff of the following formula XII and 50 parts of a dyestuff of the following formula XIII, which have been prepared by common coupling,

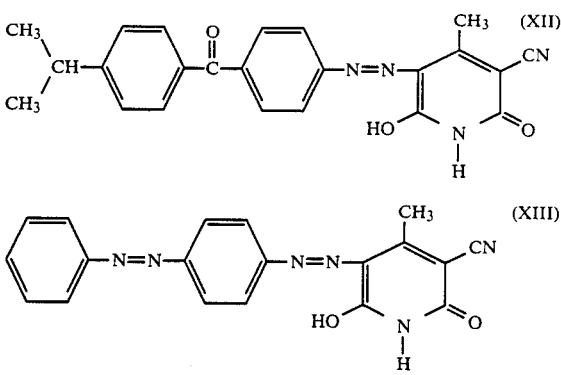

and 180 parts of a dispersing agent from the series, known in practice, of the formaldehyde/naphthalenesulphonic acid condensation products, by grinding in a bead mill in the presence of water, and this preparation is dried.

2 parts of this preparation are used for dyeing 150 parts of a polyester fibre based on polycyclohexylene terephthalate at 130° C. A deep golden yellow dyeing is thereby obtained, without noticeable amounts of dyestuff remaining in the dyebath.

EXAMPLE 6

If a mixture of 120 parts of polyester based on polyethylene terephthalate and 30 parts of cotton is used instead of the polyester material used in Example 5 and dyeing is carried out as described in Example 5, a deep yellow-coloured polyester fibre alongside a well-reserved cotton content is obtained.

EXAMPLE 7

(a) 80 parts of a dyestuff mixture consisting of the dyestuffs of the formulae X and XIII

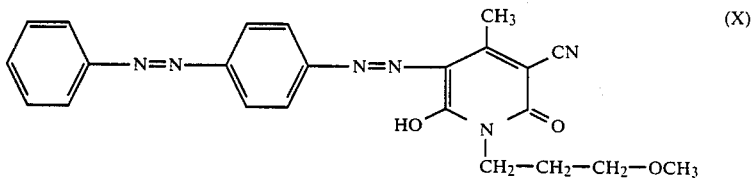

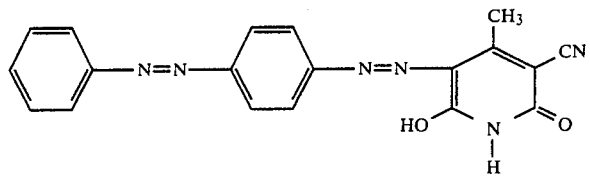

(XIII)

in a weight ratio of 50:50 (prepared by mixed coupling) are converted into a finely divided dispersion in the presence of water, also using a commercially available dispersing agent, in a bead mill and the dispersion is then spray-dried.

(b) 20 parts of the dyestuff of the formula XIV

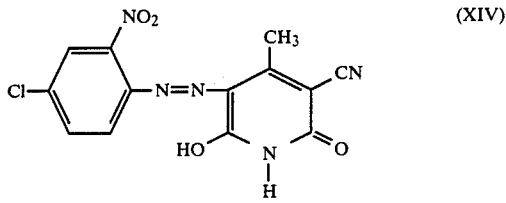

(XIV)

compare U.S. Pat. No. 3,487,066, are converted into a finely divided dispersion in the same manner as described under (a) and the dispersion is then spray-dried.

(c) The products obtained according to (a) and (b) are mixed thoroughly with one another.

(d) For dyeing of 10 parts of polyester fibres (based on polyethylene glycol terephthalate) in the form of a yarn package, a dye liquor is prepared in the customary manner from 0.1 part of the dyestuff mixture according to the invention prepared according to (c), 0.05 part of the commercial dyestuff C.I. Disperse Blue 79/1 and 0.1 part of the commercial dyestuff C.I. Disperse Red 167, and the yarn package is dyed therein at 125° to 130° C. for 30 minutes.

A deep brown dyeing and very good exhaustion of the dyebath are obtained.

(e) If the dyestuffs of the formulae X, XIII and XIV are finished together, a result identical to that described above is obtained in an analogous procedure.

EXAMPLE 8

A padding liquor is prepared from 10 parts of the dyestuff preparation described in Example 2, 10 parts of 30% strength acetic acid, 5 parts of a commercially available thickener and 965 parts of water. A woven fabric of an intimate mixture of 50 parts of polyester fibre and 50 parts of cotton is padded with the above-mentioned liquor (liquor pick-up 60%), dried at 90°–100° C. and then subjected to the thermosol process at 120° C. for 30 seconds. After a rinsing which is customary in practice, a golden yellow dyeing with outstanding fastness to light, heat-setting and thermomigration is obtained on the polyester content.

If a padding liquor containing 30 parts of the above dyestuff preparation, the composition otherwise being the same, is used, a highly fast dyeing is likewise obtained.

If the procedure as described in Example 2 is followed, but the dyestuffs mentioned in Example 2 are replaced by the dyestuffs mentioned in the following Examples 9 to 32, dyestuff mixtures according to the invention which are superior in their colorist properties, in particular in the colour build-up, to the corresponding individual dyestuffs are likewise obtained.

In Examples 9 to 14 given in the following Table 10, the two components A and B of the dyestuff mixtures according to the invention consist of dyestuffs of the formula I.

Table 10

Mixtures of dyestuffs of the formula I

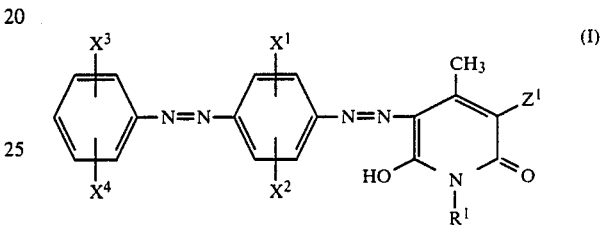

(I)

wherein, in all cases, $X^2$ denotes $X^3$, $X^4$ denotes H and $Z^1$ denotes CN.

| Example | Component | $R^1$ | $X^1$ | % content |
|---|---|---|---|---|
| 9 | A | H | H | 40 |
|  | B | CH$_3$ | H | 60 |
| 10 | A | CH$_3$ | H | 35 |
|  | B | C$_4$H$_9$ | H | 65 |
| 11 | A | CH$_3$ | H | 20 |
|  | B | (CH$_2$)$_3$OCH$_3$ | H | 80 |
| 12 | A | (CH$_2$)$_3$OCH$_3$ | H | 50 |
|  | B | (CH$_2$)$_3$O—i-C$_3$H$_7$ | H | 50 |
| 13 | A | (CH$_2$)$_3$OCH$_3$ | 2-CH$_3$ | 40 |
|  | B | (CH$_2$)$_3$OCH$_3$ | H | 60 |
| 14 | A | (CH$_2$)$_3$OCH$_3$ | H | 70 |
|  | B$^1$ | (CH$_2$)$_3$OCH$_3$ | 3-CH$_3$ | 10 |
|  | B$^2$ | (CH$_2$)$_3$O—C$_4$H$_9$ | H | 20 |
| 15 | A | (CH$_2$)$_3$OCH$_3$ | H | 35 |
|  | B | (CH$_2$)$_3$O—C$_4$H$_9$ | H | 65 |
| 16 | A | (CH$_2$)$_3$OC$_2$H$_5$ | H | 45 |
|  | B | (CH$_2$)$_3$O—C$_4$H$_9$ | H | 55 |
| 17 | A | (CH$_2$)$_3$CH$_3$ | H | 33⅓ |
|  | B$^1$ | (CH$_2$)$_3$OC$_2$H$_5$ | H | 33⅓ |
|  | B$^2$ | (CH$_2$)$_3$O—C$_4$H$_9$ | H | 33⅓ |
| 18 | A | (CH$_2$)$_2$O—C$_4$H$_9$ | H | 50 |
|  | B | (CH$_2$)$_2$O—C$_4$H$_9$ | H | 50 |
| 19 | A | (CH$_2$)$_3$OC$_3$H$_7$ | H | 50 |
|  | B | (CH$_2$)$_3$O—i-C$_3$H$_7$ | H | 50 |
| 20 | A | (CH$_2$)$_3$O—i-C$_3$H$_7$ | H | 45 |
|  | B | (CH$_2$)$_3$OC$_4$H$_9$ | H | 55 |
| 21 | A | (CH$_2$)$_3$OC$_3$H$_7$ | H | 55 |
|  | B | (CH$_2$)$_3$OC$_4$H$_9$ | H | 45 |
| 22 | A | (CH$_2$)$_3$O—i-C$_3$H$_7$ | H | 60 |
|  | B | (CH$_2$)$_3$O—i-C$_3$H$_7$ | 2-NO$_2$ | 40 |
| 23 | A | (CH$_2$)$_3$O—i-C$_3$H$_7$ | 2-NO$_2$ | 50 |
|  | B | (CH$_2$)$_3$OC$_4$H$_9$ | 2-NO$_2$ | 50 |
| 24 | A | (CH$_2$)$_3$OC$_4$H$_9$ | H | 70 |
|  | B | (CH$_2$)$_3$OC$_4$H$_9$ | 2-NO$_2$ | 30 |
| 25 | A | (CH$_2$)$_3$OC$_3$H$_7$ | 2-NO$_2$ | 45 |
|  | B | (CH$_2$)$_3$OC$_4$H$_9$ | 2-NO$_2$ | 55 |
| 26 | A | (CH$_2$)$_3$OCH$_3$ | 2-NO$_2$ | 35 |
|  | B | (CH$_2$)$_3$OC$_4$H$_9$ | 2-NO$_2$ | 75 |
| 27 | A | (CH$_2$)$_2$OC$_2$H$_5$ | H | 40 |
|  | B | (CH$_2$)$_3$OC$_4$H$_9$ | H | 60 |
| 28 | A | (CH$_2$)$_2$O—i-C$_3$H$_7$ | H | 50 |
|  | B | (CH$_2$)$_2$OC$_4$H$_9$ | H | 50 |

-continued

| Example | Component | R¹ | X¹ | % content |
|---|---|---|---|---|
| 29 | A | (CH₂)₂OC₄H₉ | H | 40 |
| | B | (CH₂)₃OC₃H₇ | H | 60 |
| 30 | A | (CH₂)₃OC₄H₉ | 2-CH₃ | 40 |
| | B | (CH₂)₃OC₄H₉ | H | 60 |
| 31 | A | (CH₂)₃OC₄H₉ | 3-CH₃ | 30 |
| | B | (CH₂)₃OC₄H₉ | H | 70 |
| 32 | A | (CH₂)₃OC₃H₇ | 3-CH₃ | 50 |
| | B | (CH₂)₃OC₄H₉ | 3-CH₃ | 50 |

Table 11

Mixtures of dyestuffs in which component A consists of dyestuffs of the formula I wherein, unless indicated otherwise, $Z^1$ denotes CN and $X^1=X^2=X^3=X^4$ denotes H, and in which component B consists of one or two dyestuffs of the formula II

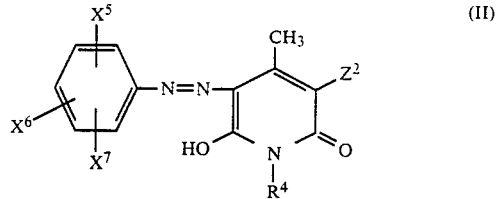

wherein, in all cases, $Z^2$ denotes CN and $X^5$ denotes H, and, if appropriate, of a dyestuff of the formula I wherein $Z^1$ denotes CN and $X^1=X^3=X^4$ denotes H.

| Example | Component | | % content |
|---|---|---|---|
| 33 | A | R¹ = (CH₂)₃OC₄H₉ | 50 |
| | B | R⁴ = CH₃; X⁶ = 3-O—SO₂C₆H₅; X⁷ = H | 50 |
| 34 | A | R¹ = (CH₂)₃OCH₃ | 45 |
| | B | R⁴ = C₂H₅; X⁷ = H | |
| | | X⁶ = 4-COO(CH₂)₂O(CH₂)₂OCH₃ | 45 |
| 35 | A | R¹ = (CH₂)₃OCH₃ | 70 |
| | B | R⁴ = C₄H₉; X⁷ = H | |
| | | X⁶ = 4-SO₂NHCH₂CH(C₂H₅)C₄H₉ | 30 |
| 36 | A | R¹ = (CH₂)₃OCH₃ | 60 |
| | B¹ (II) | R⁴ = CH₃; X⁶ = 3-O—SO₂C₆H₅ | 20 |
| | B² (II) | R⁴ = H; X⁷ = H | 20 |
| | | X⁶ = 4-(COC₆H₄—4-i-C₃H₇) | |
| 37 | A | R¹ = (CH₂)₃OCH₃ | 40 |
| | B¹ (I) | R⁴ = (CH₂)₃O—i-C₃H₇; X² = 2-NO₂ | 40 |
| | B² (II) | R⁴ = C₂H₅; X⁶ = 2-NO₂; X⁷ = 4-Cl; | 20 |
| 38 | A | R¹ = (CH₂)₃O—i-C₃H₇ | 50 |
| | B | R⁴ = C₂H₅; X⁶ = 2-NO₂; X⁷ = 4-Cl; | 50 |
| 39 | A | R¹ = (CH₂)₃OCH₃ | 55 |
| | B | R⁴ = CH₂COOC₂H₅; X⁷ = H | |
| | | X⁶ = 4-COO(CH₂)₂OCH₂CH=CH₂ | 45 |
| 40 | A | R¹ = (CH₂)₃O—i-C₃H₇ | 50 |
| | B | R⁴ = C₄H₉; X⁷ = H | 50 |
| | | X⁶ = 4-COOCH₂—⟨tetrahydrofuran⟩ | |
| 41 | A | R¹ = (CH₂)₃OC₄H₉; | 50 |
| | B | R⁴ = H; X⁷ = H | 50 |
| | | X⁶ = 4-(COC₆H₄—4-i-C₃H₇) | |
| 42 | A | R¹ = (CH₂)₃OC₄H₉; | 60 |
| | B | R⁴ = C₄H₉; X⁷ = H | 40 |
| | | X⁶ = 4-COOCH₂C₆H₅ | |
| 43 | A | R¹ = (CH₂)₃OC₃H₇; | 55 |
| | B | R⁴ = CH₃; X⁷ = H | 45 |
| | | X⁶ = 4-CONHCH₂CH(C₂H₅)C₄H₉ | |
| 44 | A | R¹ = (CH₂)₃OC₄H₉; | 70 |
| | B | R⁴ = C₂H₅; X⁶ = 2-NO₂; X⁷ = 4-Cl | 30 |
| 45 | A | R¹ = (CH₂)₃OC₂H₅; | 65 |
| | B | R⁴ = CH₃; X⁶ = 3-Cl; X⁷ = 4-Cl | 35 |
| 46 | A | R¹ = (CH₂)₂OCOC₂H₅; | 65 |
| | B | R⁴ = C₄H₉; X⁶ = 2-NO₂; X⁷ = 4-Cl | 35 |
| 47 | A | R¹ = (CH₂)₃OCH₃; X² = 2-NO₂ | 45 |
| | B | R⁴ = H; X⁶ = 4-(COC₆H₄—4-i-C₃H₇); X⁷ = H | 55 |
| 48 | A | R¹ = (CH₂)₃O—iC₃H₇; X² = 2-NO₂ | 50 |
| | B | R⁴ = CH₃; X⁶ = 3-OSO₂C₆H₅; X⁷ = H | 50 |

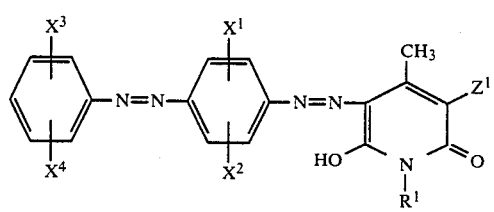

(I)

The entry B¹(II), B²(II) given in Example 36 means that component B consists of 2 dyestuffs of the formula II, and the entry B¹(I), B²(II) given in Example 37 means that component B consists of a dyestuff of the formula I and a dyestuff of the formula II.

EXAMPLE 49

A dyestuff mixture according to the invention contains 60 parts of the dyestuff of the formula

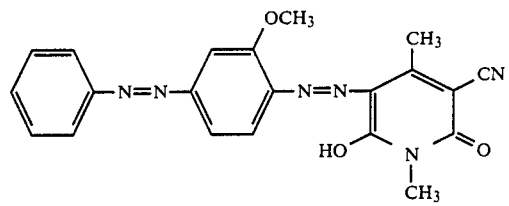

and 40 parts of the dyestuff

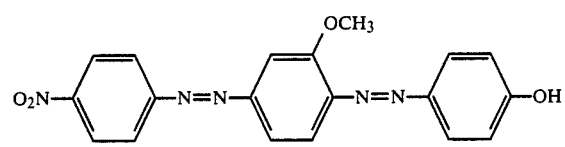

EXAMPLE 50

A dyestuff mixture according to the invention contains 55 parts of the dyestuff of the formula

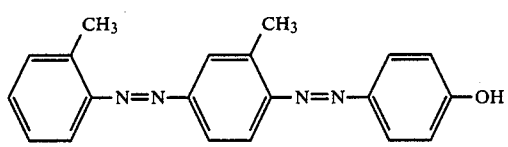

and 45 parts of the dyestuff

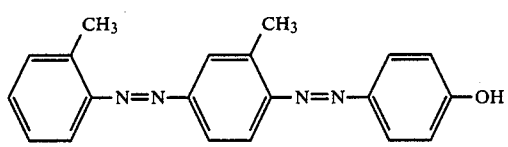

EXAMPLE 51

A dyestuff mixture according to the invention contains 85 parts of the dyestuff of the formula

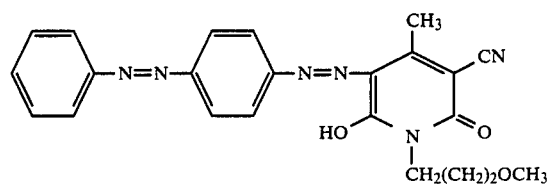

and 15 parts of the dyestuff

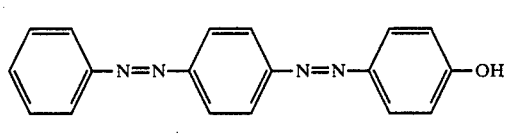

EXAMPLE 52

A dyestuff mixture according to the invention contains 50 parts of the dyestuff of the formula

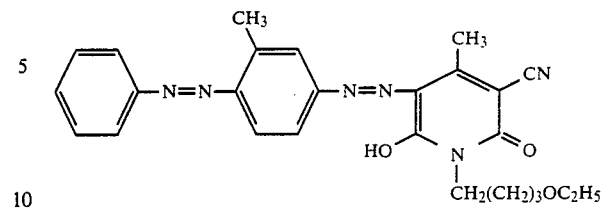

and 50 parts of the dyestuff

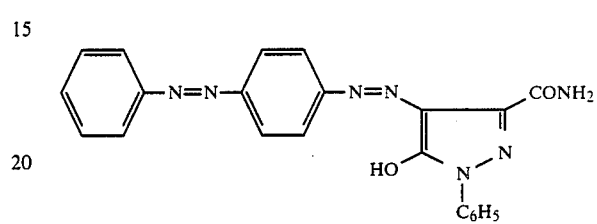

EXAMPLE 53

A dyestuff mixture according to the invention contains 65 parts of the dyestuff of the formula

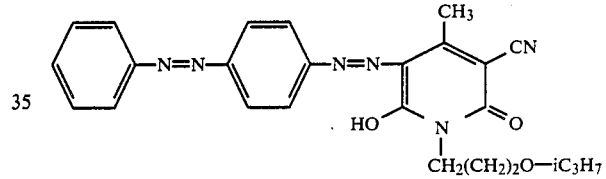

and 35 parts of the dyestuff of the formula

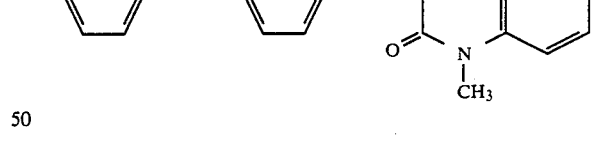

EXAMPLE 54

A dyestuff mixture according to the invention contains 70 parts of the dyestuff of the formula

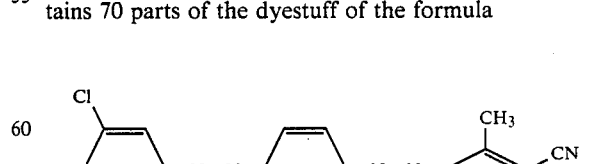

and 30 parts of the dyestuff of the formula

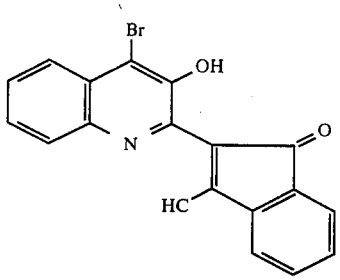

EXAMPLE 55

A dyestuff mixture according to the invention contains 80 parts of the dyestuff of the formula

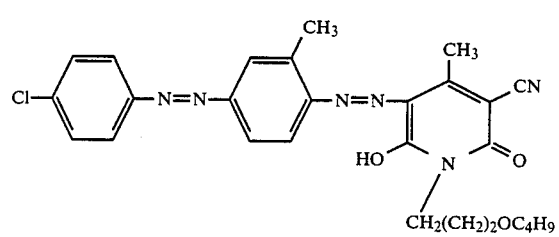

and 20 parts of the dyestuff of the formula

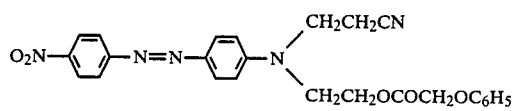

EXAMPLE 56

A dyestuff mixture according to the invention contains 85 parts of the dyestuff of the formula

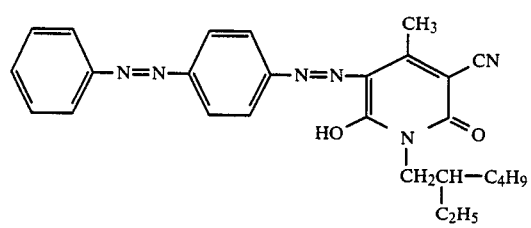

and 15 parts of the dyestuff of the formula

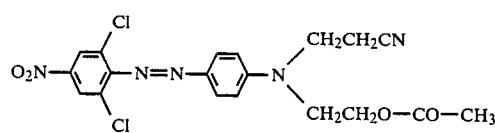

EXAMPLE 57

A dyestuff mixture according to the invention contains 75 parts of the dyestuff of the formula

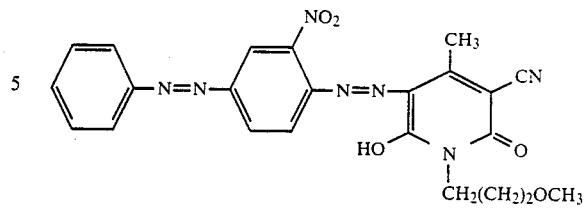

and 25 parts of the dyestuff of the formula

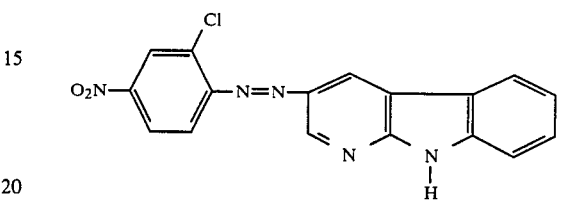

EXAMPLE 58

A dyestuff mixture according to the invention contains 80 parts of the dyestuff of the formula

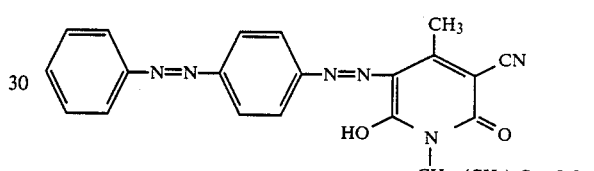

and 20 parts of the dyestuff of the formula

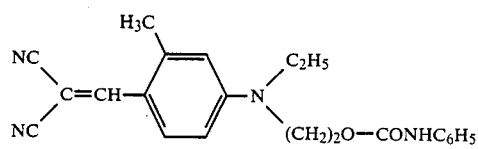

EXAMPLE 59

If a commercially available cellulose triacetate fibre is used in Example 2 instead of the polyester fibre used in that example, an equally good dyeing result is obtained.

What is claimed is:

1. Mixture of yellow disperse dyestuffs containing dyestuff components A and B in a weight ratio of A:B of (10 to 90):(90 to 10) wherein dyestuff component A is of the formula

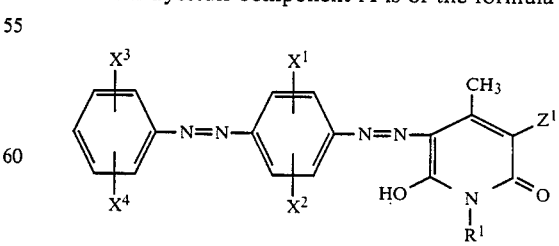

and dyestuff component B is selected from the group consisting of
(i) other dyestuffs of formula I different from component (A) and (ii) dyestuffs of the formula

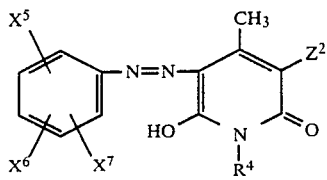

wherein $R^1$ and $R^4$ are the same or different and each is —H,
alkyl with 1 to 8 carbon atoms,
alkenyl with 3 to 5 carbon atoms,
cyclopentyl,
cyclohexyl,
phenyl,
mono- or di-substituted phenyl substituted by ($C_1$-$C_4$)alkyl, ($C_1$-$C_4$)alkoxy, hydroxy, chloro or bromo,
phenylamino,
benzyl,
furfuryl,
tetrahydrofurfuryl,
1,1-dioxotetrahydrothien-3-yl,
substituted alkyl with 1 to 8 carbon atoms substituted by —Cl, —Br, —CN, phenyl, ($C_1$-$C_4$)alkylphenyl, alkoxycarbonyl with 1 to 4 alkoxy carbon atoms, chloroalkoxycarbonyl with 1 to 4 alkoxy carbon atoms, bromoalkoxycarbonyl with 1 to 4 alkoxy carbon atoms, phenyl alkoxycarbonyl with 1 to 4 alkoxy carbon atoms, cyano alkoxycarbonyl with 1 to 4 alkoxy carbon atoms, ($C_1$-$C_4$)alkoxy-($C_1$-$C_4$)alkoxycarbonyl, ($C_1$-$C_4$alkoxy-($C_2$-$C_4$)alkoxy-($C_1$-$C_4$)alkoxycarbonyl, phenoxy alkoxycarbonyl with 1 to 4 alkoxy carbon atoms, ($C_3$-$C_5$)alkenyloxy-($C_1$-$C_4$)alkoxycarbonyl, cyclopentyloxy-($C_1$-$C_4$)alkoxycarbonyl or cyclohexyloxy-($C_1$-$C_4$)alkoxycarbonyl, or
substituted alkyl with 2 to 4 carbon atoms substituted by hydroxyl, alkoxy with 1 to 4 carbon atoms, alkoxy-alkoxy with a total of 2 to 8 carbon atoms, phenoxy, ($C_1$-$C_6$)alkylphenoxy, cyclopentylphenoxy, cyclohexylphenoxy, alkenyloxy with 3 to 5 carbon atoms, cyclopentyloxy, cyclohexyloxy, furfuryloxy, tetrahydrofurfuryloxy, alkyl carbonyloxy having 1 to 4 alkyl carbon atoms, chloroalkylcarbonyloxy having 1 to 4 alkyl carbon atoms, bromoalkylcarbonyloxy having 1 to 4 alkyl carbon atoms, cyano alkylcarbonyloxy having 1 to 4 alkyl carbon atoms, phenylalkylcarbonyloxy having 1 to 4 alkyl carbon atoms, phenoxyalkylcarbonyloxy having 1 to 4 alkyl carbon atoms, ($C_1$-$C_4$)-alkoxy-($C_1$-$C_4$)alkylcarbonyloxy, phenylcarbonyloxy, chloropenylcarbonyloxy, bromophenylcarbonyloxy, tolylcarbonyloxy, ($C_1$-$C_4$)-alkoxycarbonyloxy, ($C_1$-$C_4$)-chloroalkoxycarbonyloxy, phenyl-($C_1$-$C_4$)-alkoxycarbonyloxy, phenoxy-($C_1$-$C_4$)-alkoxycarbonyloxy ($C_1$-$C_4$)alkoxy($C_1$-$C_4$)alkoxycarbonyloxy, phenoxycarbonyloxy, chlorophenoxycarbonyloxy, bromophenoxycarbonyloxy, tolylcarbonyloxy, phenylaminocarbonyloxy, chlorophenylaminocarbonyloxy, bromophenylaminocarbonyloxy, tolyloxyaminocarbonyloxy, alkylaminocarbonyloxy having 1 to 4 alkyl carbon atoms, hydroxyalkylaminocarbonxyloxy having 1 to 4 alkyl carbon atoms, ($C_1$-$C_4$)-alkoxy-($C_1$-$C_4$)-alkylaminocarbonyloxy, phenoxyalkylaminocarbonyloxy having 1 to 4 alkyl carbon atoms, dialkylaminocarbonyloxy having 1 to 4 carbon atoms in each alkyl, hydroxydialkylaminocarbonyloxy having 1 to 4 carbon atoms in each alkyl, ($C_1$-$C_4$)-alkoxy-di-($C_1$-$C_4$)alkylaminocarbonyloxy, or phenoxydialkylaminocarbonyloxy;

$Z^1$ and $Z^2$ are the same or different and each is —CN or

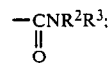

$X^1$, $X^3$ and $X^5$ are the same or different and each is —H, alkyl with 1 to 4 carbon atoms, hydroxylalkyl with 1 to 4 carbon atoms, ($C_1$-$C_4$)alkoxy-($C_1$-$C_4$)alkyl, alkoxy with 1 to 4 carbon atoms, hydroxyalkoxy with 2 to 4 carbon atoms, ($C_1$-$C_4$)-alkoxy-($C_2$-$C_4$)alkoxy, —F, —Cl, or —Br;

$X^2$ is —H, alkyl with 1 to 4 carbon atoms, alkoxy with 1 to 4 carbon atoms, hydroxyalkoxy with 2 to 4 carbon atoms ($C_1$-$C_4$)-alkoxy-($C_2$-$C_4$)alkoxy, —F, —Cl, —Br, —OH, —$NO_2$ or alkylcarbonyl-amino with 1-4 alkyl carbon atoms; and $X^1$ and $X^2$ when taken together are

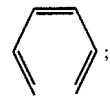

$X^4$ is —H, alkyl with 1 to 4 carbon atoms, hydroxyalkyl with 1 to 4 carbon atoms, ($C_1$-$C_4$)alkoxy-($C_1$-$C_4$)alkyl, alkoxy with 1 to 4 carbon atoms, hydroxylalkoxy with 2 to 4 carbon atoms, ($C_1$-$C_4$)alkoxy-($C_2$-$C_5$)alkoxy,

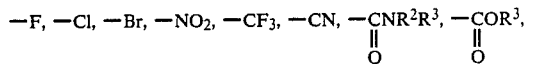

or 5-$R^3$-1,2,4-oxadiazol-3-yl;

$X^6$ is one of the $X^4$ definitions or

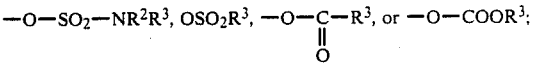

$X^7$ is one of the $X^1$ definitions or phenoxy;

$R^2$ is —H, alkyl with 1 to 8 carbon atoms, hydroxyalkyl with 2 to 4 carbon atoms, ($C_1$-$C_4$)alkoxy-($C_2$-$C_4$)alkyl, ($C_1$-$C_4$)- alkoxy-($C_1$-$C_4$)alkoxy-($C_2$-$C_4$)alkyl, allyloxy-($C_2$-$C_4$)alkyl, alkenyl with 3 to 5 carbon atoms, phenyl, bromophenyl, chlorophenyl, ($C_1$-$C_4$)alkylphenyl or benzyl; and $R^3$ is alkyl with 1 to 8 carbon atoms, hydroxyalkyl with 2 to 4 carbon atoms ($C_1$-$C_4$)alkoxy-($C_2$-$C_4$)alkyl, ($C_1$-$C_4$)alkoxy($C_1$-$C_4$)alkoxy-($C_2$-$C_4$)alkyl, allyloxy-($C_2$-$C_4$)alkyl, alkenyl with 3 to 5 carbon atoms, phenyl, bromophenyl, chlorophenyl, ($C_1$-$C_4$)alkylphenyl, benzyl, fufuryl or tetrahydrofurfuryl.

2. Mixture of yellow disperse dyestuffs according to claim 1 wherein the weight ratio of components A:B is (20 to 70):(80 to 30).

3. Mixture of yellow disperse dyestuffs according to claim 1 wherein component B is a dyestuff of formula I which is different from component A.

4. Mixture of yellow dyestuffs according to claim 1 wherein $R^1$ is
 alkyl with 1 to 8 carbon atoms,
 alkyl with 1 to 5 carbon atoms substituted by alkoxycarbonyl with 1 to 4 carbon atoms,
 hydroxyalkyl with 2 to 8 carbon atoms,
 alkyl with 2 to 8 carbon atoms substituted by alkoxy with 1 to 4 carbon atoms, or
 alkyl with 2 to 8 carbon atoms substituted by alkoxycarbonyloxy with 1 to 4 carbon atoms.

5. Mixture of yellow, disperse dyestuffs according to claim 1 wherein
 $X^1$ and $X^5$ are the same or different and each is —H, alkyl with 1 to 4 carbon atoms, alkoxy with 1 to 4 carbon atoms, alkoxy with 2 to 4 carbon atoms substituted by alkoxy with 1 to 4 carbon atoms, —F, —Cl, or —Br;
 $X^2$ is —H, alkyl with 1 to 4 carbon atoms, —Cl, Br, or —NO$_2$; and $X^1$ and $X^2$ when taken together are

$X^3$ is —H, alkyl with 1 to 4 carbon atoms, alkoxy with 1 to 4 carbon atoms, alkoxy with 2 to 4 carbon atoms substituted by alkoxy with 1 to 2 carbon atoms, —F, —Cl or —Br; and
 $X^4$ is —H, —F, —Cl, —Br, —NO$_2$, alkyl with 1 to 4 carbon atoms, or —COOR$^3$;
 $X^6$ is —H, —NO$_2$, —Cl, alkyl with 1 to 4 carbon atoms, alkyl with 2 to 4 carbon atoms substituted by alkoxy with 1 to 4 carbon atoms, allyloxy substituted alkyl with 2 to 4 carbon atoms, —SO$_2$NR$^2$R$^3$, —COR$^3$, —CONR$^2$R$^3$, —SO$_2$NH$_2$, —COOR$^3$, —OSO$_2$R$^3$, —O—CO—R$^3$, —O—COOR$^3$ or —O-SO$_2$NR$^2$R$^3$;
 $X^7$ is —H, alkyl with 1 to 4 carbon atoms, or phenoxy; and
 $R^2$ and $R^3$ are the same or different and each is alkyl with 1 to 4 carbon atoms or alkyl with 2 to 4 carbon atoms substituted by alkoxy with 1 to 4 carbon atoms.

6. Mixture of yellow disperse dyestuffs according to claim 1 wherein
 $X^1$ is —H, —Cl, —F, methyl or methoxy;
 $X^2$ is —H, —Cl, —NO$_2$ or methyl;
 $X^3$ is —H, methyl, methoxy, ethoxy, —F, —Cl or —Br; and
 $X^4$ is —H, —Cl, methyl, —NO$_2$, —COCH$_3$, —COC$_2$H$_5$, —CO(CH$_2$)$_2$OCH$_3$, or
         ‖       ‖        ‖
         O       O        O

—CO(CH$_2$)$_2$OCH$_2$H$_5$;
         ‖
         O $X^5$ is —H, —Cl, methyl or methoxy;
 $X^6$ is —H, —Cl, —NO$_2$, methyl —SO$_2$NH$_2$, OCONH(C$_2$-C$_8$ alkyl) OCOO(C$_2$-C$_8$-alkyl), —SO$_2$NH(C$_2$-C$_8$-alkyl), SO$_2$NH(C$_2$-C$_8$-alkyl); furylmethoxycarbonyl, —COO(CH$_2$)$_2$OCH$_2$CH=CH$_2$, benzylcarbonyloxy, —OSO$_2$—C$_6$H$_5$, —OXO$_2$—N(CH$_3$)$_2$, —COOCH$_2$C$_6$H$_5$, —COO(CH$_2$)$_2$O(CH$_2$)$_2$—OCH$_3$, —CO—C$_6$H$_5$, or —CO—C$_6$—H$_4$—(C$_1$-C$_4$ alkyl); and
 $X^7$ is —H or methyl.

7. Process for the preparation of yellow disperse dyestuffs of claim 1 which comprises mixing components A and B in the finished state or in the unifinished state with subsequent finishing.

8. In the process of coloring synthetic fibers with an azo dyestuff by the high temperature exhaustion dyeing process, the thermosol dyeing process or by printing,
 the improvement comprises said azo dyestuff being a yellow disperse dyestuff according to claim 1 wherein components A and B are added to a dyebath or printing paste as a mixture or A and B are added to a dyebath or printing paste successively and dyeing or printing is subsequently carried out.

9. Mixture of yellow disperse dyestuffs containing dyestuff components A and B in a weight ratio of A:B of (10 to 90):(90 to 10)
 wherein dyestuff component A is of the formula

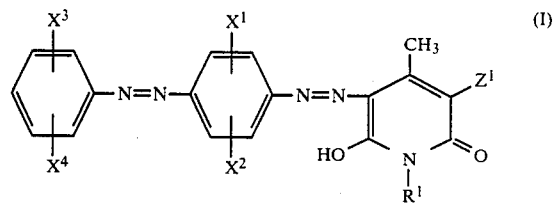 (I)

and dyestuff component B is a dyestuff of the formula

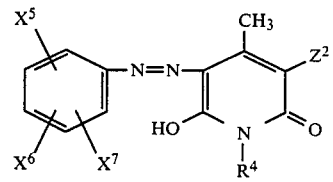

wherein $R^1$ and $R^4$ are the same or different and each is —H;
 alkyl with 1 to 8 carbon atoms,
 alkenyl with 3 to 5 carbon atoms,
 cyclopentyl,
 cyclohexyl,
 phenyl,
 phenylamino,
 benzyl,
 furfuryl,
 tetrahydrofurfuryl,
 1,1-dioxotetrahydrothien-3-yl,
 substituted alkyl with 1 to 8 carbon atoms substituted by —Cl, —Br, —CN, phenyl, (C-C$_4$)alkylphenyl, alkoxycarbonyl with 1 to 4 alkoxy carbon atoms, chloroalkoxycarbonyl with 1 to 4 alkoxy carbon atoms, bromoalkoxycarbony with 1 to 4 alkoxy carbon atoms, phenyl alkoxycarbonyl with 1 to 4 alkoxy carbon atoms, cyano alkoxycarbonyl with 1 to 4 alkoxy carbon atoms, (C$_1$-C$_4$)alkoxy-(C$_1$-C$_4$)alkoxycarbonyl, (C$_1$-C$_4$)alkoxy-(C$_2$-C$_4$)alkoxy-(C$_1$-C$_4$)alkoxycarbonyl, phenoxy alkoxycarbonyl with 1 to 4 alkoxy carbon atoms, (C$_3$-C$_5$)alkenyloxy(C$_1$-C$_4$)alkoxycarbonyl, cyclopentyloxy-(C$_1$-C$_4$)alkoxycarbonyl or cyclohexyloxy-(C$_1$-C$_4$)alkoxycarbonyl, or
 substituted alkyl with 2 to 4 carbon atoms substituted by hydroxyl, alkoxy with 1 to 4 carbon atoms, alkoxy-alkoxy with a total of 2 to 8 carbon atoms, phenoxy, $(C_1-C_6)$alkylphenoxy, cyclopentylphenoxy, cyclohexylphenoxy, alkenyloxy with 3 to 5 carbon atoms, cyclopentyloxy, cyclohexyloxy, furfuryloxy, tetrahydrofurfuryloxy, alkyl carbonyloxy having 1 to 4 alkyl carbon atoms, chloroalkylcarbonyloxy having 1 to 4 alkyl carbon atoms, bromoalkylcarbonyloxy having 1 to 4 alkyl carbon atoms, cyano alkylcarbonyloxy having 1 to 4 alkyl carbon atoms, phenylalkylcarbonyloxy having 1 to 4 alkyl carbon atoms, phenoxyalkylcarbonyloxy having 1 to 4 alkyl carbon atoms, $(C_1-C_4)$alkoxy-$(C_1-C_4)$alkylcarbonyloxy, phenylcarbonyloxy, chlorophenylcarbonyloxy, bromophenylcarbonyloxy, tolylcarbonyloxy, $(C_1-C_4)$-alkoxycarbonyloxy, $(C_1-C_4)$-chloroalkoxycarbonyloxy, $(C_1-C_4)$-bromoalkoxycarbonyloxy, $(C_1-C_4)$cyanoalkoxycarbonyloxy, phenyl-$(C_1-C_4)$-alkoxycarbonyloxy, phenoxy-$(C_1-C_4)$-alkoxycarbonylox $(C_1-C_4)$alkoxy-$(C_1-C_4)$alkoxycarbonyloxy, phenoxycarbonyloxy, chlorophenoxycarbonyloxy, bromophenoxycarbonyloxy, tolylcarbonyloxyoxy, phenylaminocarbonyloxy, chlorophenylaminocarbonyloxy, bromophenylaminocarbonyloxy, tolyloxyaminocarbonyloxy, alkylaminocarbonyloxy having 1 to 4 alkyl carbon atoms, hydroxyalkylaminocarbonyloxy having 1 to 4 alkyl carbon atoms, $(C_1-C_4)$-alkoxy-$(C_1-C_4)$alkylaminocarbonyloxy, phenoxyalkylaminocarbonyloxy having 1 to 4 alkyl carbon atoms, dialkylaminocarbonyloxy having 1 to 4 carbon atoms in each alkyl, hydroxydialkylaminocarbonyloxy having 1 to 4 carbon atoms in each alkyl, $(C_1-C_4)$-alkoxy-di-$(C_1-C_4)$alkylaminocarbonyloxy, or phenoxydialkylaminocarbonyloxy;

$R^2$ is —H, alkyl with 1 to 8 carbon atoms, hydroxyalkyl with 2 to 4 carbon atoms, $(C_1-C_4)$alkoxy-$(C_2-C_4)$-alkyl, $(C_1-C_4)$alkoxy-$(C_1-C_4)$alkoxy-$(C_2-C_4)$alkyl, allyloxy, an alkenyl with 3 to 5 carbon atoms, a phenyl or a benzyl;

$R^3$ is alkyl with 1 to 8 carbon atoms, hydroxyalkyl with 2 to 4 carbon atoms, $(C_1-C_4)$alkoxy-$(C_2-C_4)$alkyl, $(C_1-C_4)$alkoxy-$(C_1-C_4)$alkoxy-$(C_2-C_4)$alkyl, allyloxy, an alkenyl with 3 to 5 carbon atoms, a phenyl, a benzyl, furfuryl or tetrahydrofurfuryl $X^1$, $X^3$ and $X^5$ are the same or different and each is —H, alkyl with 1 to 4 carbon atoms, hydroxyalkyl with 1 to 4 carbon atoms, $(C_1-C_4)$alkoxy-$(C_1-C_4)$alkyl, alkoxy with 1 to 4 carbon atoms, hydroxyalkoxy with 2 to 4 carbon atoms, $(C_1-C_4)$-alkoxy-$(C_2-C_4)$alkoxy, —F, —Cl, or —Br;

$X^2$ is —H, alkyl with 1 to 4 carbon atoms, alkoxy with 1 to 4 carbon atoms, hydroxyalkoxy with 2 to 4 carbon atoms, $(C_1-C_4)$alkoxy-$(C_2-C_4)$alkoxy, —F, —Cl, —Br, —OH, —NO$_2$ or alkylcarbonylamino with 1-4 alkyl carbon atoms; and $X^1$ and $X^2$ when taken together are

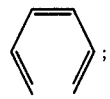

$X^4$ is —H, alkyl with 1 to 4 carbon atoms, hydroxyalkyl with 1 to 4 carbon atoms, $(C_1-C_4)$alkoxy-$(C_1-C_4)$alkyl, alkoxy with 1 to 4 carbon atoms, hydroxyalkoxy with 2 to 4 carbon atoms, $(C_1-C_4)$alkkoxy-$(C_2-C_5)$alkkoxy, —F, —Cl, —Br, —NO$_2$, —CF$_3$, —CN, —CNR$^2$R$^3$, —COR$^3$,
                                          ‖         ‖
                                          O         O —CR$^3$, —SO$_2$—NR$^2$R$^3$, —SO$_2$—OR$^3$, —SO$_2$—R$^3$, —SO$_2$—NH$_2$
 ‖
 O or 5-R$^3$-1,2,4-oxadiazol-3-yl;

$X^6$ is one of the $X^4$ definitions or

—O—SO$_2$—NR$^2$R$^3$, —OSO$_2$R$^3$, or —O—C—R$^3$,
                                              ‖
                                              O $X^7$ is one of the $X^1$ definitions or phenoxy; and $Z^1$ and $Z^2$ are the same or different and each is —CN or

—CNR$^2$R$^3$.
 ‖
 O

10. Mixture of yellow dyestuffs according to claim 9 wherein $R^1$ is
   alkyl with 1 to 8 carbon atoms,
   alkyl with 1 to 5 carbon atoms substituted by alkoxycarbonyl with 1 to 4 carbon atoms,
   hydroxyalkyl with 2-8 carbon atoms,
   alkyl with 2 to 8 carbon atoms substituted by alkoxy with 1 to 4 carbon atoms, or
   alkyl with 2 to 8 carbon atoms substituted by alkoxycarbonyloxy with 1 to 4 carbon atoms.

11. Mixture of yellow disperse dyestuffs according to claim 9 wherein component B additionally contains a dyestuff of formula I which is different from component A.

12. Mixture of yellow, disperse dyestuffs according to claim 9 wherein
   $X^1$ and $X^5$ are the same or different and each is —H, alkyl with 1 to 4 carbon atoms, alkoxy with 1 to 4 carbon atoms, alkoxy with 2 to 4 carbon atoms substituted by alkoxy with 1 to 4 carbon atoms, —F, —Cl, or —Br;
   $X^2$ is —H, alkyl with 1 to 4 carbon atoms, —Cl, Br or —NO$_2$; and $X^1$ and $X^2$ when taken together are

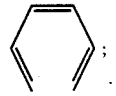

$X^3$ is —H, alkyl with 1 to 4 carbon atoms, alkoxy with 1 to 4 carbon atoms, alkoxy with 2 to 4 carbon atoms substituted by alkoxy with 1 to 2 carbon atoms, —F, —Cl, or —Br;
   $X^4$ is —H, —F, —Cl, —Br, —NO$_2$, alkyl with 1 to 4 carbon atoms, or —COOR$^3$;
   $X^6$ is —H, —NO$_2$, —Cl, alkyl with 1 to 4 carbon atoms, alkyl with 2 to 4 carbon atoms substituted by alkoxy with 1 to 4 carbon atoms, allyloxy substituted alkyl with 2 to 4 carbon atoms, —SO$_2$NR$^2$R$^3$, —COR$^3$, —CONR$^2$R$^3$, —SO$_2$NH$_2$, —COOR$^3$, —OSO$_2$R$^3$, O—CO—R$^3$, O—COOR$^3$, or —O-SO$_2$NR$^2$R$^3$;

$X^7$ is —H, alkyl with 1 to 4 carbon atoms, or phenoxy; and $R^2$ and $R^3$ are the same or different and each is alkyl with 1 to 4 carbon atoms or alkyl with 2 to 4 carbon atoms substituted by alkoxy with 1 to 4 carbon atoms.

13. Mixture of yellow disperse dyestuffs according to claim 9 wherein $X^1$ is —H, —Cl, —F, methyl or methoxy;

$X^2$ is —H, —Cl, —NO$_2$ or methyl;

$X^3$ is —H, methyl, methoxy, ethoxy, —F, —Cl, or —Br;

$X^4$ is —H, —Cl, methyl,

—NO$_2$, —COCH$_3$, —COC$_2$H$_5$, —CO(CH$_2$)$_2$OCH$_3$, or
                    ||              ||                 ||
                    O               O                  O

—CO(CH$_2$)$_2$OC$_2$H$_5$;
||
O $X^5$ is —H, —Cl, methyl or methoxy;

$X^6$ is —H, —Cl, —NO$_2$, methyl, —SO$_2$NH$_2$, OCONH(C$_2$-C$_8$ alkyl) OCOO(C$_2$-C$_8$-alkyl), —SO$_2$NH(C$_2$-C$_8$-alkyl), SO$_2$NH(C$_2$-C$_8$-alkyl); furyl-methoxycarbonyl, —COO(CH$_2$)$_2$OCH$_2$CH=CH$_2$, benzylcarbonyloxy, —OSO$_2$—C$_6$H$_5$, —OSO$_2$—N(CH$_3$)$_2$, or —CO—C$_6$H$_5$, it also abeing possible —COOCH$_2$C$_6$H$_5$, —COO(CH$_2$)$_2$O(CH$_2$)$_2$—OCH$_3$, —CO—C$_6$H$_5$, or —CO—C$_6$—H$_4$-(C$_1$-C$_4$ alkyl); and $X^7$ is —H or methyl.

14. In the process of coloring synthetic fibers with an azo dyestuff by the high temperature exhaustion dyeing process, the thermosol dyeing proccess, or by printing, the improvement comprises said azo dyestuff being a yellow disperse dyestuff according to claim 9 wherein components A and B are added to dyebath or printing paste as a mixture or A and B are added to a dyebath or printing paste successively and dyeing or printing is subsequently carried out.

15. Mixture of yellow disperse dyestuffs containing dyestuff components A and B in a weight ratio of A:B of (10 to 90):(90 to 10) wherein dyestuff component A is of the formula

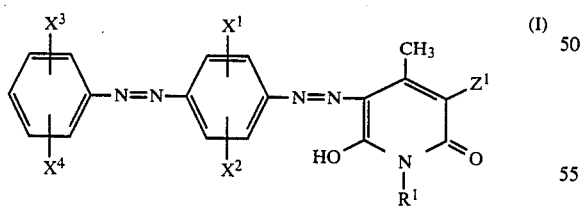
(I)

and dyestuff component B is one or more dyestuffs selected from the group consisting of

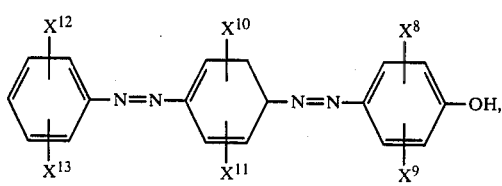

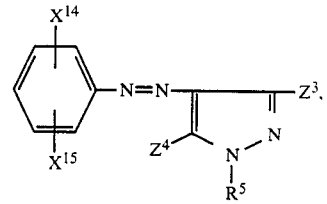

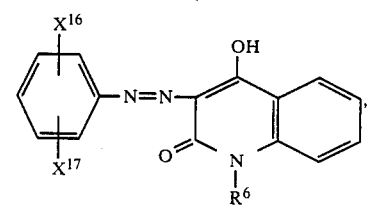

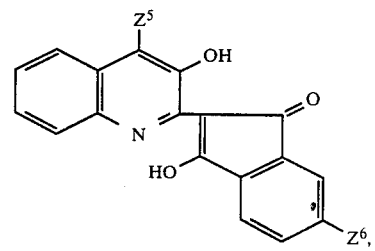

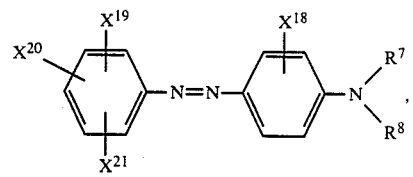

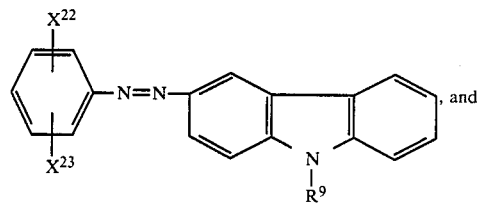

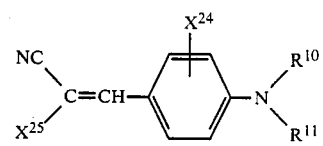

wherein $R^1$ and $R^5$ are the same or different and each is —H;
alkyl with 1 to 8 carbon atoms,
alkenyl with 3 to 5 carbon atoms,
cyclopentyl,
cyclohexyl,
phenyl,
mono- or di-substituted phenyl substituted by (C$_1$-C$_4$)alkyl, (C$_1$-C$_4$)alkoxy, hydroxy, chloro or bromo,
phenylamino,
benzyl,
furfuryl,
tetrahydrofurfuryl,
1,1-dioxotetrahydrothien-3-yl,
substituted alkyl with 1 to 8
carbon atoms substituted by —Cl, —Br, —CN, phenyl, (C$_1$-C$_4$)alkylphenyl, alkoxycarbonyl with 1 to 4 alkoxy carbon atoms, chloroalkoxycarbonyl with 1 to 4 alkoxy carbon atoms, bromoalkoxycarbonyl with 1 to 4 alkoxy carbon atoms, phenyl alkoxycarbonyl with 1 to 4 alkoxy carbon atoms, cyano alkoxycarbonyl with 1 to 4 alkoxy carbon atoms, $(C_1-C_4)$alkoxy-$(C_1-C_4)$alkoxycarbonyl, $(C_1-C_4)$alkoxy-$(C_2-C_4)$alkoxy-$(C_1-C_4)$alkoxycarbonyl, phenoxy alkoxycarbonyl with 1 to 4 alkoxy carbon atoms, $(C_3-C_5)$alkenyloxy$(C_1-C_4)$alkoxycarbonyl, cyclopentyloxy-$(C_1-C_4)$alkoxycarbonyl or cyclohexyloxy-$(C_1-C_4)$alkoxycarbonyl, or substituted alkyl with 2 to 4 carbon atoms substituted by hydroxyl, alkoxy with 1 to 4 carbon atoms, alkoxy-alkoxy with a total of 2 to 8 carbon atoms, phenoxy $(C_1-C_6)$alkylphenoxy, cyclopentylphenoxy, cyclohexylphenoxy, alkenyloxy with 3 to 5 carbon atoms, cyclopentyloxy, cyclohexyloxy, furfuryloxy, tetrahydrofurfuryloxy, alkyl carbonyloxy having 1 to 4 alkyl carbon atoms, chloroalkylcarbonyloxy having 1 to 4 alkyl carbon atoms, bromoalkylcarbonyloxy having 1 to 4 alkyl carbon atoms, cyano alkylcarbonyloxy having 1 to 4 alkyl carbon atoms, phenylalkylcarbonyloxy having 1 to 4 alkyl carbon atoms, phenoxyalkylcarbonyloxy having 1 to 4 alkyl carbon atoms, $(C_1-C_4)$alkoxy-$(C_1-C_4)$alkylcarbonyloxy, phenylcarbonyloxy, chlorophenylcarbonyloxy, bromophenylcarbonyloxy, tolylcarbonyloxy, $(C_1-C_4)$-alkoxycarbonyloxy, $(C_1-C_4)$-chloroalkoxycarbonyloxy, $(C_1-C_4)$-bromoalkoxycarbonyloxy, $(C_1-C_4)$cyanoalkoxycarbonyloxy, phenyl-$(C_1-C_4)$-alkoxycarbonyloxy, phenoxy-$(C_1-C_4)$-alkoxycarbonyloxy, $(C_1-C_4)$alkoxy-$(C_1-C_4)$alkoxycarbonyloxy, phenoxycarbonyloxy, chlorophenoxycarbonyloxy, bromophenoxycarbonyloxy, tolylcarbonyloxy, phenylaminocarbonyloxy, chlorophenylaminocarbonyloxy, bromophenylaminocarbonyloxy, tolyloxyaminocarbonyloxy, alkylaminocarbonyloxy having 1 to 4 alkyl carbon atoms, hydroxyalkylaminocarboxyloxy having 1 to 4 alkyl carbon atoms, $(C_1-C_4)$-alkoxy-$(C_1-C_4)$alkylaminocarbonyloxy, phenoxyalkylaminocarbonyloxy having 1 to 4 alkyl carbon atoms, dialkylaminocarbonyloxy having 1 to 4 carbon atoms in each alkyl, hydroxydialkylaminocarbonyloxy having 1 to 4 carbon atoms in each alkyl, $(C_1-C_4)$-alkoxy-di-$(C_1-C_4)$alkylaminocarbonyloxy, or phenoxydialkylaminocarbonyloxy;

$R^2$ is —H, alkyl with 1 to 8 carbon atoms, hydroxyalkyl with 2 to 4 carbon atoms, $(C_1-C_4)$alkoxy-$(C_2-C_4)$-alkyl, $(C_1-C_4)$alkoxy-$(C_1-C_4)$alkoxy-$(C_2-C_4)$alkyl, allyloxy-$(C_2-C_4)$alkyl, alkenyl with 3 to 5 carbon atoms, phenyl, bromophenyl, chlorophenyl, $(C_1-C_4)$alkylphenyl, or benzyl; and $R^3$ is alkyl with 1 to 8 carbon atoms, hydroxyalkyl with 2 to 4 carbon atoms, $(C_1-C_4)$alkoxy-$(C_2-C_4)$alkyl, $(C_1-C_4)$alkoxy-$(C_1-C_4)$alkkoxy-$(C_2-C_4)$alkyl, allyloxy-$(C_2-C_4)$alkyl, alkenyl with 3 to 5 carbon atoms, phenyl, bromophenyl, chlorophenyl, $(C_1-C_4)$alkylphenyl, benzyl, furfuryl or tetrahydrofurfuryl;

$R^6$ is —H or alkyl with 1 to 4 carbon atoms;

$R^7$ and $R^{10}$ are the same or different and each is —H, alkyl with 1 to 4 carbon atoms $(C_1-C_4)$alkyl-COOR$^{12}$, cyanoalkyl with 1 to 4 alkyl carbon atoms, phenyl alkyl having 1 to 4 carbon atoms, chloroalkyl having 1 to 4 carbon atoms, hydroxyalkyl with 2 to 4 carbon atoms, $(C_1-C_4)$alkoxy-$(C_2-C_4)$alkyl, phenoxyalkyl with 2 to 4 carbon atoms, or $(C_1-C_4)$alkyl-OCO—R$^{12}$;

$R^8$ is one of the $R^7$ definitions or phenyl;

$R^9$ is —H, alkyl with 1 to 4 carbon atoms, $(C_1-C_4)$alkyl-COOR$^{12}$, cyanoalkyl with 1 to 4 alkyl carbon atoms, hydroxyalkyl with 2 to 4 carbon atoms, $(C_1-C_4)$alkoxy-$(C_2-C_4)$alkyl, hydroxyalkoxy-alkyl with 2 to 4 alkoxy carbon atoms and 2 to 4 alkyl carbon atoms, $(C_2-C_4)$alkoxy-$(C_2-C_4)$alkoxy-$(C_2-C_4)$alkyl, or $(C_2-C_4)$alkoxy-$(C_2-C_4)$alkoxy-$(C_2-C_4)$alkoxy-$(C_2-C_4)$alkyl;

$R^{11}$ is —H,
  alkyl with 1 to 4 carbon atoms,
  chloroalkyl with 2 to 4 carbon atoms, or
  alkyl with 2 to 4 carbon atoms substitute by -5-benzothiazol-2-yl,

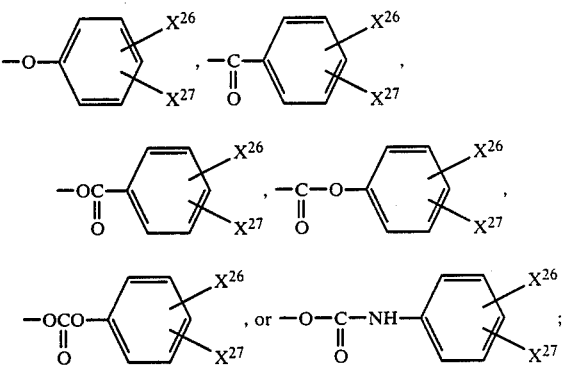

$R^{12}$ is alkyl with 1 to 4 carbon atoms, $(C_1-C_4)$alkoxy-$(C_2-C_4)$alkyl, phenoxyalkyl with 2 to 4 alkyl carbon atoms, allyloxy-$(C_2-C_4)$alkyl, or hydroxyalkyl with 2 to 4 carbon atoms;

$X^1$, $X^3$, $X^8$ and $X^{12}$ are the same or different and each is —H, alkyl with 1 to 4 carbon atoms, hydroxyalkyl with 1 to 4 carbon atoms, $(C_1-C_4)$alkoxy-$(C_1-C_4)$alkyl, alkoxy with 1 to 4 carbon atoms, hydroxyalkoxy with 2 to 4 carbon atoms, $(C_1-C_4)$alkoxy-$(C_2-C_4)$alkoxy, —F, —Cl, or —Br;

$X^2$ and $X^{13}$ are the same or different and each is —H, alkyl with 1 to 4 carbon atoms, alkoxy with 1 to 4 carbon atoms, hydroxyalkoxy with 2 to 4 carbon atoms, $(C_1-C_4)$alkoxy-$(C_2-C_4)$alkoxy, —F, —Cl, —Br, —OH, —NO$_2$ or alkylcarbonylamino with 1-4 alkyl carbon atoms; and $X^1$ and $X^2$ when taken together are

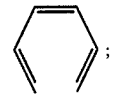

$X^4$ is —H, alkyl with 1 to 4 carbon atoms, hydroxyalkyl with 1 to 4 carbon atoms, $(C_1-C_4)$alkoxy-$(C_1-C_4)$alkyl, alkoxy with 1 to 4 carbon atoms, hydroxyalkoxy with 2 to 4 carbon atoms, $(C_1-C_4)$alkkoxy-$(C_2-C_5)$alkkoxy,

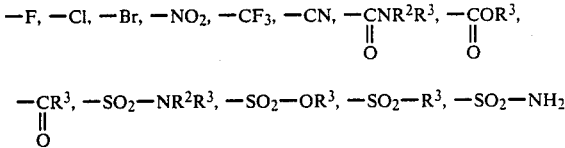

or 5-$R^3$-1,2,4-oxadiazol-3-yl;

$X^9$ us —H or alkyl with 1 to 4 carbon atoms;

$X^{10}$ is —H, —F, —Cl, —Br, alkyl with 1 to 4 carbon atoms, alkoxy with 1 to 4 carbon atoms, hydroxyalkoxy with 2 to 4 carbon atoms, or ($C_1$–$C_4$)alkoxy-($C_2$–$C_4$)alkoxy;

$X^{11}$ is one of the $X^{10}$ definitions, hydroxy or alkylcarbonylamino with 1 to 4 alkyl carbon atoms; and $X^{10}$ and $X^{11}$ when taken together are

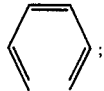;

$X^{14}$ is one of the $X^4$ definitions or

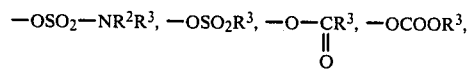

phenoxy or substituted phenoxyl;

$X^{15}$ is one of the definitions of $X^1$ or nitro or phenylazo;

$X^{16}$ is —H, nitro, alkyl with 1 to 4 carbon atoms, phenylazo or phenylazo substituted by at least one of —Cl, —$CH_3$, —$OCH_3$ or —$NO_2$;

$X^{17}$ is —H, —F, —Cl, —Br, alkyl with 1 to 4 carbon atoms, alkoxy with 1 to 4 carbon atoms, or ($C_1$–$C_4$)alkoxy($C_2$–$C_4$)alkoxy;

$X^{18}$ is —H, —Cl, —Br, alkyl with 1 to 4 carbon atoms, alkylcarbonylamino with 1 to 4 alkyl carbon atoms, chloroalkylcarbonylamino with 1 to 4 alkyl carbon atoms, bromoalkylcarbonylamino with 1 to 4 alkyl carbon atoms, or ($C_1$–$C_4$)alkoxy-($C_1$–$C_4$)alkylcarbonyl amino;

$X^{19}$ is

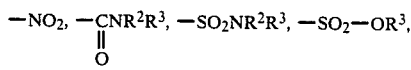

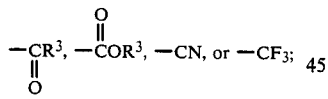

$X^{20}$ is

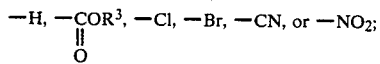

$X^{21}$ is —H, Cl, or Br;

$X^{22}$ is

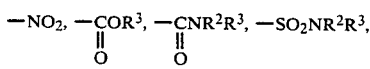

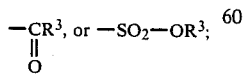

$X^{23}$ is —H, —F, —Cl, —Br, or —CN;

$X^{24}$ is —H, —F, —Cl, —Br, alkyl with 1 to 4 carbon atoms, alkoxy with 1 to 4 carbon atoms, or ($c_1$–$C_4$)alkoxy-($C_2$–$C_4$)-alkoxy;

$X^{25}$ is

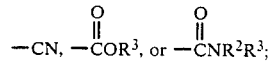

$S^{26}$ and $X^{27}$ are the same or different and each is —H, cyclopentyl, cyclohexyl, alkyl with 1 to 4 carbon atoms, alkoxy with 1 to 4 carbon atoms, —Cl, or —Br;

$Z^1$ is

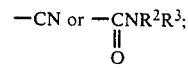

$Z^3$ is alkyl with 1 to 4 carbon atoms,

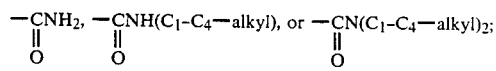

$Z^4$ is —OH or —$NH_2$;

$Z^5$ is —H, —Br, or —Cl;

$Z^6$ is

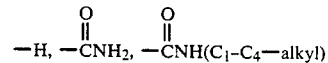

or —CN($C_1$–$C_4$-alkyl)$_2$.

16. Mixture of yellow dyestuffs according to claim 15 wherein $R^1$ is
   alkyl with 1 to 8 carbon atoms,
   alkyl with 1 to 5 carbon atoms substituted by alkoxycarbonyl with 1 to 4 carbon atoms,
   hydroxyalkyl with 2–8 carbon atoms,
   alkyl with 2 to 8 carbon atoms substituted by alkoxy with 1 to 4 carbon atoms, or
   alkyl with 2 to 8 carbon atoms substituted by alkoxycarbonyloxy with 1 to 4 carbon atoms.

17. Mixture of yellow, disperse dyestuffs according to claim 15 wherein
   $R_2$ and $R_3$ are the same or different and each is alkyl with 1 to 4 carbon atoms or alkyl with 2 to 4 carbon atoms substituted by alkoxy with 1–4 carbon atoms;
   $R^5$ is —H, alkyl with 1 to 4 carbon atoms, phenyl, hydroxy phenyl, 1,1-dioxo-tetrahydro-thiophen-3-yl, or alkyl with 2 to 4 carbon atoms substituted by phenylaminocarbonyloxy;
   $R^7$ is —H, alkyl with 1 to 4 carbon atoms, benzyl, ($C_1$–$C_4$)alkoxycarbonyl-($C_1$–$C_4$)alkyl, hydroxyalkyl with 2 to 4 carbon atoms, ($C_1$–$C_4$-alkyl)carbonyloxy-($C_2$–$C_4$)alkyl, cyanoalkyl with 2 to 4 carbon atoms, chloroalkyl with 2 to 4 carbon atoms, phenylalkyl with 2 to 4 carbon atoms, alkyl with 2 to 4 carbon atoms substituted by alkoxy with 1 to 4 carbon atoms, phenoxyalkyl with 2 to 4 carbon atoms, or phenoxy-($C_1$–$C_4$ alkyl)-carbonyloxy($C_1$–$C_4$)alkyl;
   $R^8$ is alkyl with 1 to 4 carbon atoms, phenyl, benzyl, ($C_1$–$C_4$)alkoxycarbonyl-($C_1$–$C_4$)alkyl, hydroxyalkyl with 2 to 4 carbon atoms, ($C_1$–$C_4$-alkyl)carbonyloxy-($C_2$–$C_4$)alkyl, cyanoalkyl with 2 to 4 carbon atoms, chloroalkyl with 2 to 4 carbon atoms, phenylalkyl with 2 to 4 carbon atoms, alkyl with 2 to 4 carbon atoms substituted by alkoxy with 1 to 4 carbon atoms, phenoxyalkyl with 2 to 4 carbon atoms, or phenoxy-($C_1$–$C_4$ alkyl)-carbonyloxy($C_1$–$C_4$)alkyl;

$R^9$ and $R^{10}$ are the same or different and each is —H or alkyl with 1 to 4 carbon atoms;

$R^{11}$ is 2-(phenoxy)ethyl; 2-(cyclohexyl-phenoxy)-ethyl, 2-(cyclopentylphenoxy)-ethyl, 2-(dichlorophenylaminocarbonyloxy)-ethyl, 2-(phenylaminocarbonyloxy)-ethyl, 2-chloro-ethyl or —(CH$_2$)$_2$-S-benzothiazol-2-yl;

$X^1$ is —H, alkyl with 1 to 4 carbon atoms, alkoxy with 1 to 4 carbon atoms, alkoxy with 2 to 4 carbon atoms substituted by alkoxy with 1 to 4 carbon atoms, —F, —Cl, or —Br;

$X^2$ is —H, alkyl with 1 to 4 carbon atoms, —Cl, Br, or —NO$_2$; and $X^1$ and $X^2$ when taken together are

$X^3$ is —H, alkyl with 1 to 4 carbon atoms, alkoxy with 1 to 4 carbon atoms, alkoxy with 2 to 4 carbon atoms substituted by alkoxy with 1 to 2 carbon atoms, —F, —Cl, or —Br;

$X^4$ is —H, —F, —Cl, —Br, —NO$_2$, alkyl with 1 to 4 carbon atoms, or —COOR$^3$;

$X^8$ is —H, alkyl with 1 to 4 carbon atoms, —Cl, —Br, alkoxy with 1 to 4 carbon atoms, hydroxy-alkoxy with 2 to 4 carbon atoms, or alkoxy with 2 to 4 carbon atoms substituted by alkoxy with 1 to 4 carbon atoms;

$X^9$ is —H or alkyl with 1 to 4 carbon atoms;

$X^{10}$ is —H, alkyl with 1 to 4 carbon atoms, alkoxy with 1 to 4 carbon atoms, or alkoxy with 2 to 4 carbon atoms substituted by alkoxy with 1 to 4 carbon atoms;

$X^{11}$ is —H, alkyl with 1 to 4 carbon atoms, alkoxy with 1 to 4 carbon atoms; or alkoxy with 2 to 4 carbon atoms substitute by alkoxy with 1 to 4 carbon atoms, —Cl, or —OH; and $X^{12}$ and $X^{11}$ when taken together are

$X^{13}$ is —H, —NO$_2$, —OH, alkyl with 1 to 4 carbon atoms, alkoxy with 1 to 4 carbon atoms, alkoxy with 2 to 4 carbon atoms, alkylcarbonylamino with 1 to 4 carbon atoms in the alkyl radical;

$X^{12}$ is —H or alkyl with 1 to 4 carbon atoms;

$X^{14}$ is —H, —NO$_2$, alkyl with 1 to 4 carbon atoms, alkoxy with 1 to 4 carbon atoms,

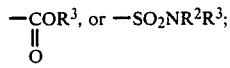

$X^{15}$ is —H, —NO$_2$, —Cl or phenylazo;

$X^{16}$ is —H, —NO$_2$, phenylazo, or alkyl with 1 to 4 carbon atoms;

$X^{17}$ is —H, —Cl, —Br, —F, alkyl with 1 to 4 carbon atoms or alkoxy with 1 to 4 carbon atoms;

$X^{18}$ is —H, —Cl, Br, alkyl with 1 to 4 carbon atoms, or alkylcarbonylamino with 1 to 4 carbon atoms in the alkyl, substituted alkyl carbonylamino with 1 to 4 carbon atoms substituted by alkoxy with 1 to 4 carbon atoms;

$X^{19}$ is —NO$_2$; alkoxy-carbonyl with 1 to 4 carbon atoms in the alkoxy, —SO$_2$N($C_1$-$C_4$-alkyl)-($C_1$-$C_4$-alkyl) or alkoxy-sulphon with 1 to 4 carbon atoms in the alkoxy;

$X^{20}$ is —H, —Cl, —Br, —CN or —NO$_2$;

$X^{21}$ is —H, —Cl, or —Br;

$X^{22}$ is —NO$_2$ $X^{23}$ is —H, —F, —Cl, —Br, or —CN;

$X^{24}$ is —H, Cl, alkyl with 1 to 4 carbon atoms, or alkoxy with 1 to 4 carbon atoms;

$X^{25}$ is —CN or —COOR$^3$; and $Z^3$ is alkyl with 1 to 4 carbon atoms or

18. Mixture of yellow disperse dyestuffs according to claim 15 wherein $R^5$ is —H, phenyl, hydroxyphenyl, 2-(phenylaminocarbonyloxy)-ethyl, or 1,1-dioxo-tetrahydro-thiophen-3-yl;

$R^6$ is —H or methyl;

$R^7$ is —H, methyl, ethyl, propyl, butyl, 2-hydroxyethyl, 2-cyanoethyl, 2-chloroethyl, 2-acetyloxyethyl, 2-(methoxycarbonyl)-ethyl, 2-(methylcarbonyloxy)-ethyl, or 2-(ethylcarbonyloxy)-ethyl;

$R^8$ is —H, phenyl, 2-cyanoethyl, 2-hydroxyethyl, 2-(ethylcarbonyloxy)-ethyl, or 2-(methoxycarbonyl)-ethyl;

$R^{11}$ is 2-(phenoxy)-ethyl, 2-(4-cyclohexylphenoxy)-ethyl, 2-(3,4-dichlorophenylaminocarbonyloxy)-ethyl, 2-(phenylaminocarbonyloxy)-ethyl, or 2-chloro-ethyl;

$X^1$ is —H, —Cl, —F, methyl or methoxy;

$X^2$ is —H, —Cl, —NO$_2$ or methyl;

$X^3$ is —H, methyl, methoxy, ethoxy, —F, —Cl, or —Br;

$X^4$ is —H, —Cl, methyl,

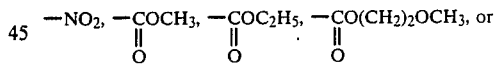

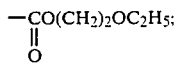

$X^8$ and $X^9$ and $X^{13}$ are the same or different and each is —H or methyl;

$X^{10}$ is —H, methyl or methoxy;

$X^{11}$ is —H, methyl, methoxy, —Cl, or —OH; and $X^{10}$ and $X^{11}$ when taken together are

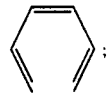

$X^{12}$ is —H, methyl, methoxy, —NO$_2$, —OH, 2-hydroxyethoxy, or acetylamino;

$X^{14}$ is —H, methyl, methoxy, —NO$_2$, —COOCH$_3$, —SO$_2$N($C_1$-$C_2$-alkyl)-($C_1$-$C_2$ alkyl);

$X^{15}$ is —H, —NO$_2$, —Cl, or phenylazo;

$X^{16}$ is —H, —NO$_2$, or phenylazo;

$X^{17}$ is —H or methyl;
$X^{18}$ is —H, —Cl, methyl, or acetylamino;
$X^{19}$ is —NO$_2$, methoxycarbonyl, or dimethylaminosulphonyl;
$X^{20}$ is —H, —Cl, —Br or —CN;
$X^{21}$ is —H, —Cl, or —Br;
$X^{22}$ is —NO$_2$;
$X^{23}$ is —H, —Cl, or —Br;
$X^{24}$ is —H, —Cl, methyl or methoxy;
$X^{25}$ is —CN;
$Z^3$ is methyl or —CONH$_2$;
$Z^4$ is —OH or —NH$_2$; and
$Z^5$ is —H or BR.

19. In the process of coloring synthetic fibers with an azo dyestuff by the high temperature exhaustion dyeing process, the thermosol dyeing process or by printing, wherein the improvement comprises said azo dyestuff being a yellow disperse dyestuff according to claim 1 wherein components A and B are added to a dyebath or printing paste as a mixture or A and B are added to dyebath or printing paste successively and dyeing or printing is subsequently carried out.

20. The process according to claim 19 wherein the synthetic fibers are polyester fibers.

* * * * *